US010676886B2

(12) United States Patent
Strelcheck et al.

(10) Patent No.: US 10,676,886 B2
(45) Date of Patent: Jun. 9, 2020

(54) SYSTEMS, DEVICES, AND METHODS FOR STORING AND SPREADING A MATERIAL

(71) Applicant: THE TORO COMPANY, Bloomington, MN (US)

(72) Inventors: Jen Strelcheck, Kingsford, MI (US); Tristan Summers, Kingsford, MI (US); Steven Grunlund, Felch, MI (US); Jon Coyne, Kingsford, MI (US); Nathan Benjamin Kohn, Belgium, WI (US)

(73) Assignee: THE TORO COMPANY, Bloomington, MN (US)

( * ) Notice: Subject to any disclaimer, the term of this patent is extended or adjusted under 35 U.S.C. 154(b) by 187 days.

(21) Appl. No.: 15/782,401

(22) Filed: Oct. 12, 2017

(65) Prior Publication Data
US 2018/0106005 A1   Apr. 19, 2018

Related U.S. Application Data

(60) Provisional application No. 62/464,960, filed on Feb. 28, 2017, provisional application No. 62/407,855, filed on Oct. 13, 2016.

(51) Int. Cl.
*E01H 10/00* (2006.01)
*A01C 17/00* (2006.01)
(Continued)

(52) U.S. Cl.
CPC ......... *E01H 10/007* (2013.01); *A01C 15/003* (2013.01); *A01C 15/006* (2013.01);
(Continued)

(58) Field of Classification Search
CPC ..... E01H 10/002; E01H 10/007; E01C 19/20; E01C 19/203; E01C 2019/207;
(Continued)

(56) References Cited

U.S. PATENT DOCUMENTS

| 3,297,617 A | 1/1967 | Regenstein et al. |
| 3,583,646 A | 6/1971 | Bogenschutz |

(Continued)

FOREIGN PATENT DOCUMENTS

| DE | 2423822 A1 | 12/1974 |
| DE | 9416907 U1 | 4/1995 |

(Continued)

OTHER PUBLICATIONS

European Search Report issued in counterpart European Patent Application No. 1719078.4 dated Feb. 6, 2018.
(Continued)

*Primary Examiner* — Darren W Gorman
(74) *Attorney, Agent, or Firm* — Marshall, Gerstein & Borun LLP

(57) ABSTRACT

A material spreading system may include a tote and a spreader attachable to a loading machine. The spreader may include a frame, an inlet, a lift arm, and a discharge mechanism configured to selectively discharge the material onto the ground. The tote may include a container having a plurality of walls enclosing an internal volume for storing a material. An opening may be formed in one of the plurality of walls and communicate with the internal volume. The tote may additionally include a lift arm engaging surface configured to engage the lift arm and permit the lift arm to manipulate the tote. The tote may also include a closure member at least partially covering the opening and configured to selectively permit transfer of the material from the container to the inlet of the spreader in response to the material exerting a force on the closure member.

28 Claims, 14 Drawing Sheets

(51) Int. Cl.
*E01C 19/20* (2006.01)
*A01C 15/00* (2006.01)

(52) U.S. Cl.
CPC .......... *A01C 17/001* (2013.01); *E01C 19/203* (2013.01); *E01C 19/20* (2013.01); *E01C 2019/207* (2013.01); *E01C 2019/2095* (2013.01); *E01H 10/002* (2013.01)

(58) Field of Classification Search
CPC .......... E01C 2019/2095; A01C 15/003; A01C 15/006; A01C 17/001
See application file for complete search history.

(56) References Cited

U.S. PATENT DOCUMENTS

| | | |
|---|---|---|
| 3,655,093 A | 4/1972 | Sadwith |
| 4,261,520 A | 4/1981 | Hetrick |
| 4,405,089 A | 9/1983 | Taylor |
| 4,522,341 A | 6/1985 | Wall et al. |
| 4,523,280 A | 6/1985 | Bachman |
| 4,588,113 A | 5/1986 | Egerdahl |
| 4,966,311 A | 10/1990 | Taylor |
| 5,108,038 A | 4/1992 | Palladino et al. |
| 5,170,947 A | 12/1992 | Houle et al. |
| 5,375,773 A | 12/1994 | Lewis |
| 5,445,192 A | 8/1995 | Hansen |
| 5,603,452 A | 2/1997 | Hester |
| 5,842,649 A | 12/1998 | Beck et al. |
| 5,911,362 A | 6/1999 | Wood et al. |
| 5,947,391 A | 9/1999 | Beck et al. |
| 5,988,534 A | 11/1999 | Kost et al. |
| D425,915 S | 5/2000 | Truan et al. |
| 6,068,200 A | 5/2000 | Kime |
| 6,089,478 A | 7/2000 | Truan et al. |
| 6,220,532 B1 | 4/2001 | Manon |
| 6,398,137 B1 | 6/2002 | Manon et al. |
| 6,422,490 B1 | 7/2002 | Truan et al. |
| 6,517,281 B1 | 2/2003 | Rissi |
| 6,520,458 B2 | 2/2003 | Podoll et al. |
| 6,536,067 B1 | 3/2003 | Truan et al. |
| 6,557,944 B1 | 5/2003 | Connor |
| D476,999 S | 7/2003 | Truan et al. |
| D478,543 S | 8/2003 | Truan et al. |
| 6,637,678 B2 | 10/2003 | Wyne |
| 6,702,208 B1 * | 3/2004 | Hadler ................ A01C 17/001 239/650 |
| 6,715,703 B2 | 4/2004 | Kost et al. |
| 6,722,590 B2 | 4/2004 | Kost et al. |
| 6,817,552 B2 | 11/2004 | Kinkead et al. |
| 6,907,832 B2 | 6/2005 | Wyne |
| 6,910,646 B2 * | 6/2005 | Vernon ................ A01C 17/001 239/650 |
| 6,932,287 B2 | 8/2005 | Kost et al. |
| 6,953,163 B2 | 10/2005 | Truan et al. |
| 6,978,952 B2 | 12/2005 | Kost et al. |
| 7,104,478 B2 | 9/2006 | Niemela et al. |
| 7,118,053 B2 | 10/2006 | Truan et al. |
| 7,196,276 B1 | 3/2007 | Cope |
| D544,428 S | 6/2007 | Truan et al. |
| 7,293,723 B2 | 11/2007 | Niemela et al. |
| 7,306,175 B1 | 12/2007 | Farmer |
| D559,759 S | 1/2008 | Truan et al. |
| 7,347,390 B2 | 3/2008 | Truan et al. |
| 7,431,227 B2 | 10/2008 | Gamble, II et al. |
| 7,481,384 B2 | 1/2009 | Truan et al. |
| 7,530,777 B2 | 5/2009 | Hintzsche et al. |
| 7,540,436 B2 | 6/2009 | Truan et al. |
| 7,748,652 B2 | 7/2010 | Musso et al. |
| 7,753,293 B2 | 7/2010 | Farmer |
| 8,025,245 B2 | 9/2011 | Truan et al. |
| 8,028,938 B2 | 10/2011 | Truan et al. |
| 8,185,276 B2 | 5/2012 | Buckbee et al. |
| 8,262,004 B2 | 9/2012 | Gamble, II et al. |
| 8,282,312 B2 | 10/2012 | Braddy et al. |
| D673,586 S | 1/2013 | Truan et al. |
| D673,587 S | 1/2013 | Truan et al. |
| 8,448,882 B2 | 5/2013 | Kemmerling et al. |
| 8,474,735 B2 | 7/2013 | Hobbs, Jr. et al. |
| 8,505,837 B2 | 8/2013 | Warchola |
| 8,523,086 B2 | 9/2013 | Warchola |
| 8,757,521 B2 | 6/2014 | Cichy et al. |
| 8,796,981 B2 * | 8/2014 | Zindel ................. A01C 15/006 318/560 |
| 8,888,025 B2 | 11/2014 | Sandler |
| 8,919,663 B2 | 12/2014 | Cantin et al. |
| 8,960,574 B2 | 2/2015 | Hernandez |
| 9,033,265 B2 | 5/2015 | Truan et al. |
| 9,085,862 B2 | 7/2015 | Norkus et al. |
| 9,085,863 B2 | 7/2015 | Norkus et al. |
| 9,096,979 B2 | 8/2015 | Larsen |
| 2003/0168522 A1 | 9/2003 | Kost et al. |
| 2003/0168536 A1 | 9/2003 | Kost et al. |
| 2004/0140377 A1 | 7/2004 | Kost et al. |
| 2004/0144857 A1 | 7/2004 | Kost et al. |
| 2007/0069044 A1 | 3/2007 | Sandler et al. |
| 2008/0077300 A1 | 3/2008 | Balogh |
| 2012/0023434 A1 | 1/2012 | Ording et al. |
| 2012/0126023 A1 | 5/2012 | Cantin et al. |
| 2014/0117122 A1 | 5/2014 | Pare et al. |
| 2014/0286739 A1 | 9/2014 | Helmsderfer et al. |
| 2014/0321950 A1 | 10/2014 | Krenek et al. |
| 2014/0374515 A1 | 12/2014 | Truan et al. |
| 2015/0175365 A1 | 6/2015 | Picard et al. |
| 2015/0284922 A1 | 10/2015 | Phelps |
| 2016/0312423 A1 | 10/2016 | Kohn |

FOREIGN PATENT DOCUMENTS

| | | |
|---|---|---|
| DE | 29600737 U1 | 2/1996 |
| FI | 102306 B1 | 11/1998 |
| FR | 1592096 A | 5/1970 |
| FR | 2216755 A1 | 8/1974 |
| FR | 2284271 A1 | 4/1976 |
| FR | 2855533 A1 | 12/2004 |
| GB | 1468902 A | 3/1977 |

OTHER PUBLICATIONS

International Search Report and Written Opinion, International Application No. PCT/US2016/028989, dated Aug. 2, 2016.

* cited by examiner

SYSTEMS, DEVICES, AND METHODS FOR STORING AND SPREADING A MATERIAL

CROSS REFERENCE TO RELATED APPLICATIONS

This application claims the priority benefit of each of U.S. Provisional Patent Application No. 62/407,855, filed Oct. 13, 2016, and U.S. Provisional Patent Application No. 62/464,960, filed on Feb. 28, 2017. The entire contents of each of the foregoing are expressly incorporated by reference herein for all purposes.

FIELD OF DISCLOSURE

The present disclosure generally relates to systems, devices, and methods for spreading a material over the ground. More particularly, the present disclosure relates to storing a de-icing material at an application site and adapting a loading machine to spread the de-icing material over the ground at the application site.

BACKGROUND OF THE DISCLOSURE

De-icing materials such as salt, grit, sand, and liquid chemicals oftentimes are spread onto roadways, parking lots, sidewalks, driveways, and other ground surfaces for melting snow and/or ice. The de-icing materials typically are stored at a central storage location and transported to various application sites by a gritter or salt truck. This type of distribution scheme requires substantial time and costs, in part because of the need to employ crews to drive to the central storage location, load up the de-icing material, and deliver it to the application site. Furthermore, this distribution scheme may result in delays in the de-icing material reaching the application site, particularly in the event of a sudden or unexpected snow and/or ice storm.

Many de-icing materials must be stored indoors or else they will degrade when exposed to environmental elements. Indoor storage of the de-icing material, however, is not practical for many users due to, for example, space constraints. Furthermore, transferring the de-icing material into a spreading machine can be labor intensive process, especially if performed manually with a shovel, for example. While attachments exist for adapting a loading machine such as a skid loader for spreading a material onto the ground, typically such attachments are not well suited for spreading a de-icing material. For instance, many conventional attachments will obstruct the field of view of the operator of the loading machine, which is undesirable when spreading a de-icing material because the operator may need to maneuver the loading machine over a relatively large area (e.g., a parking lot) which is scattered with various obstacles (e.g., cars, light posts, curbs, speed bumps, etc.).

The present disclosure sets forth systems, methods, and devices for spreading a de-icing material embodying advantageous alternatives to existing spreading systems, devices, and methods, and that may address one or more of the challenges or needs mentioned herein, as well as provide other benefits and advantages.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings is necessarily to scale.

SUMMARY

Figure 1:
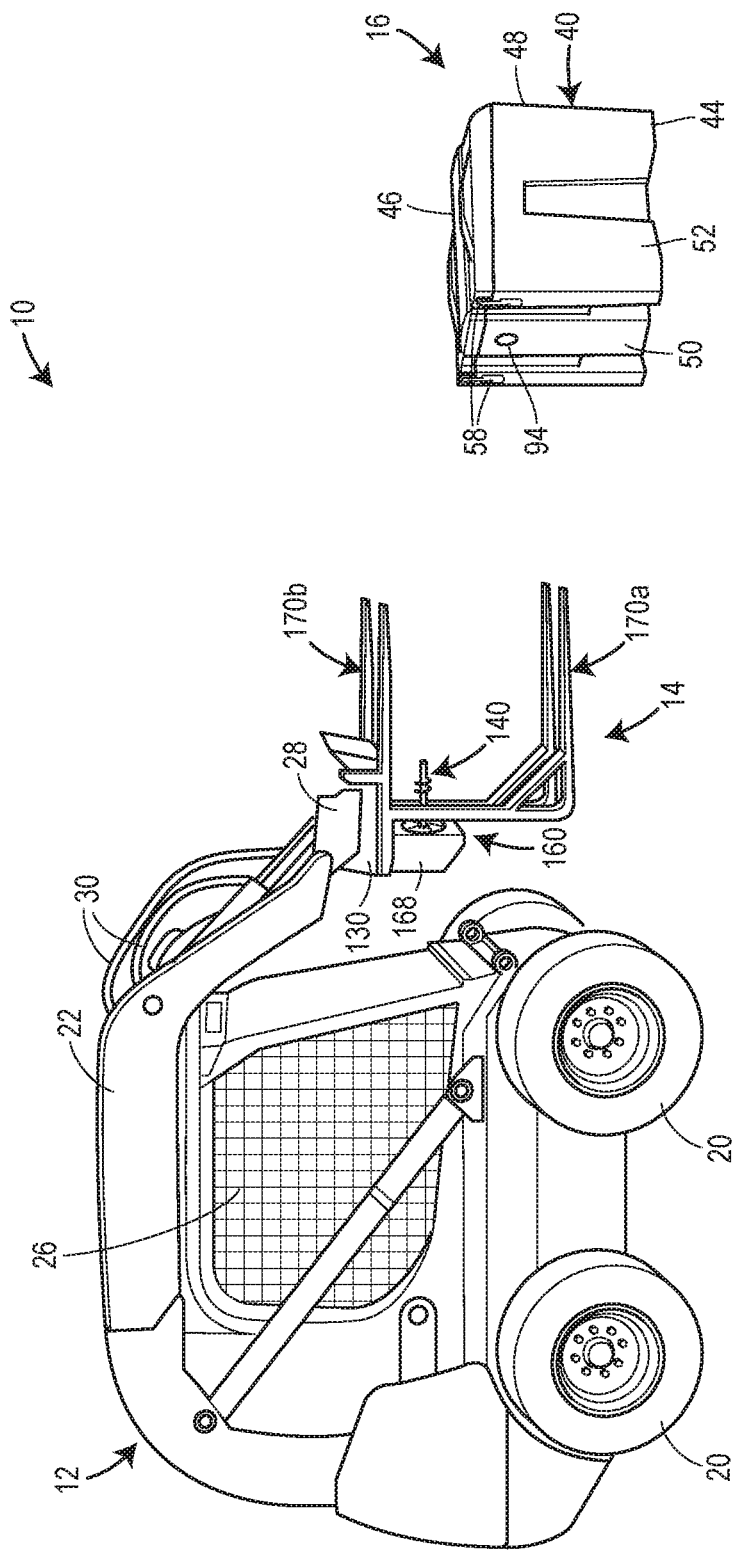
FIG. 1 illustrates a side perspective view of one embodiment of a spreading system in accordance with principles of the present disclosure.

One aspect of the present disclosure provides a material spreading system including a spreader and a tote. The spreader may include a frame attachable to a loading machine, an inlet for receiving a material, a discharge mechanism configured to selectively discharge the material onto the ground, and a lift arm. The tote may include a container having a plurality of walls enclosing an internal volume for storing the material, an opening formed in one of the plurality of walls and communicating with the internal volume, a first lift arm engaging surface, and a closure member at least partially covering the opening. The first lift arm engaging surface may be configured to engage the lift arm and permit the lift arm to manipulate the tote. The closure member may be configured to selectively permit transfer of the material from the container to the inlet of the spreader in response to the material exerting a force on the closure member.

Another aspect of the present disclosure provides a tote for storing a material. The tote may include an internal volume enclosed by a bottom wall, a top wall, a front wall extending between the bottom wall and the top wall, a first sidewall extending between the front wall and the rear wall, and a second sidewall extending between the front wall and the rear wall. The tote may additionally include an opening extending through the front wall of the container. Furthermore, at least a portion of the internal volume may taper in a direction towards the opening.

Yet another aspect of the present disclosure provides a spreader for a loading machine. The spreader may include a frame attachable to the loading machine, an inlet for receiving a material, a discharge mechanism, and a lift arm. The discharge mechanism may be configured to selectively discharge the material onto the ground. The lift arm may have a stop member extending in the first direction and a support member extending in a second direction away from the frame.

An additional aspect of the present disclosure provides a spreading method for a material stored in a tote. The method may include: (a) attaching a spreader to a loading machine; (b) aligning a lift arm of the spreader with a groove formed in a bottom wall of the tote; (c) driving the loading machine in a forward direction toward the tote such that the lift arm is inserted into the groove; (d) using the loading machine to rotate the tote to a position where the tote is positioned above a discharge mechanism of the spreader, thereby allowing the material to fall through an opening in the tote onto the discharge mechanism; and (e) operating the discharge mechanism to discharge the material onto the ground.

DETAILED DESCRIPTION

In general, the present disclosure relates to systems, devices, and methods for use with a skid loader or other loading machine for spreading a granular de-icing material (e.g., grit, salt, and sand), a liquid de-icing material (e.g., a liquid magnesium solution), or any combination thereof, or any other material, onto roadways, parking lots, sidewalks, driveways, and other ground surfaces for de-icing and other purposes. The system may include a spreader attachment which can be removably connected to the boom of a loading machine. The spreader attachment may include a discharge mechanism configured to spread the de-icing material onto the ground and which may be powered by, for example, the hydraulics of the loading machine. The system may further include a tote which, in addition to providing a freestanding container for storing the de-icing material prior to use, may function as a hopper for channeling the de-icing material toward the discharge mechanism of the spreader attachment when the tote is mounted on the spreader attachment. The tote may be sized and dimensioned so that it can be carried by the loading machine, via the spreader attachment, during a spreading operation without substantially obstructing the field of view of an operator of the loading machine. Furthermore, the tote may include a closure member which is selectively openable to permit the transfer of the de-icing material from the tote to the spreader attachment. When the tote is not being used as a hopper for the spreader attachment, the closure member may seal close the tote to protect the de-icing material from degrading environmental elements such as water and humidity. The presently disclosed system may eliminate or reduce the need to rely on gritters or salt trucks dispatched from a central storage location, thereby improving the speed and/or efficiency at which a de-icing material can be spread over an application site in response to a winter weather event or other event or situation necessitating to spread of a material onto the ground.

Each of the foregoing components of the system, as well as methods of using the system, will now be described in detail in connection with various embodiments.

FIG. 1 is an illustration of a spreading system 10 including a loading machine 12, a spreader 14, and a tote 16 filled with a de-icing material. The loading machine 12 shown in FIG. 1 corresponds to a conventional skid loader; however, the loading machine 12 may be any maneuverable machine with a loading arm or boom including, but not limited to, a backhoe, a wheel loader, a tractor, or an excavator. The loading machine 12 may include wheels 20 and a boom 22, each of which may powered by a hydraulic pump (not illustrated). An operator 24 (see FIG. 18) of the loading machine 12 may sit inside a protective cage or cab 26. To raise and lower the boom 22, manipulate tools connected to the boom 22, and/or drive the wheels 20, a series of control levers, buttons, pedals, etc. may be included inside the protective cage or cab 26.

The boom 22 may include a mounting plate 28 or other connector member for removably connecting various tools to the loading machine 12. One or more hydraulic lines 30 may be integrated into the boom 22 to supply the tool with hydraulic pressure from the hydraulic pump of the loading machine 12. The hydraulic lines 30 may include quick disconnect couplings at their terminal ends to facilitate connection to the hydraulic lines of the tool mounted on to the boom 22.

Figure 2:
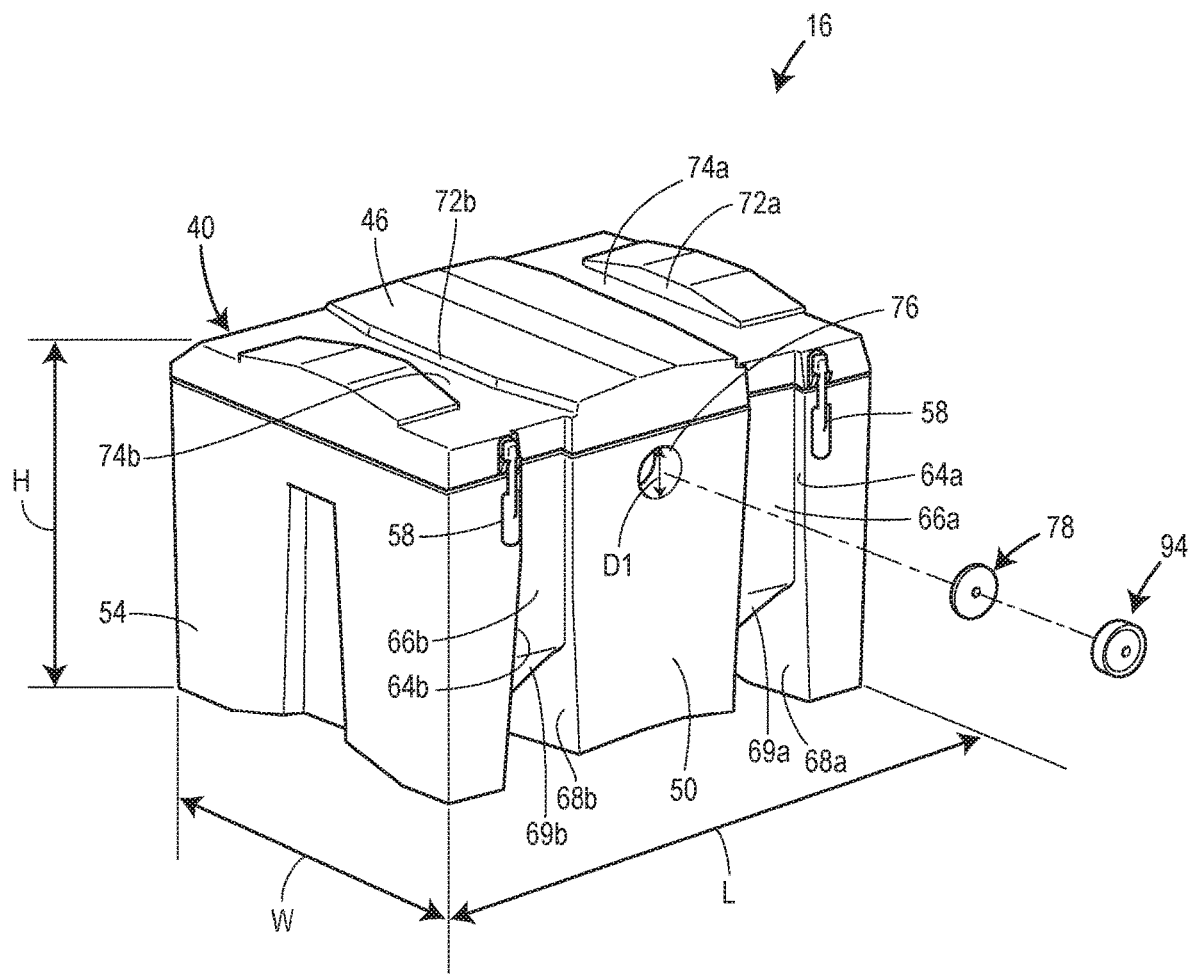
FIG. 2 is an exploded assembly view of one embodiment of a tote in accordance with principles of the present disclosure.
Figure 3:
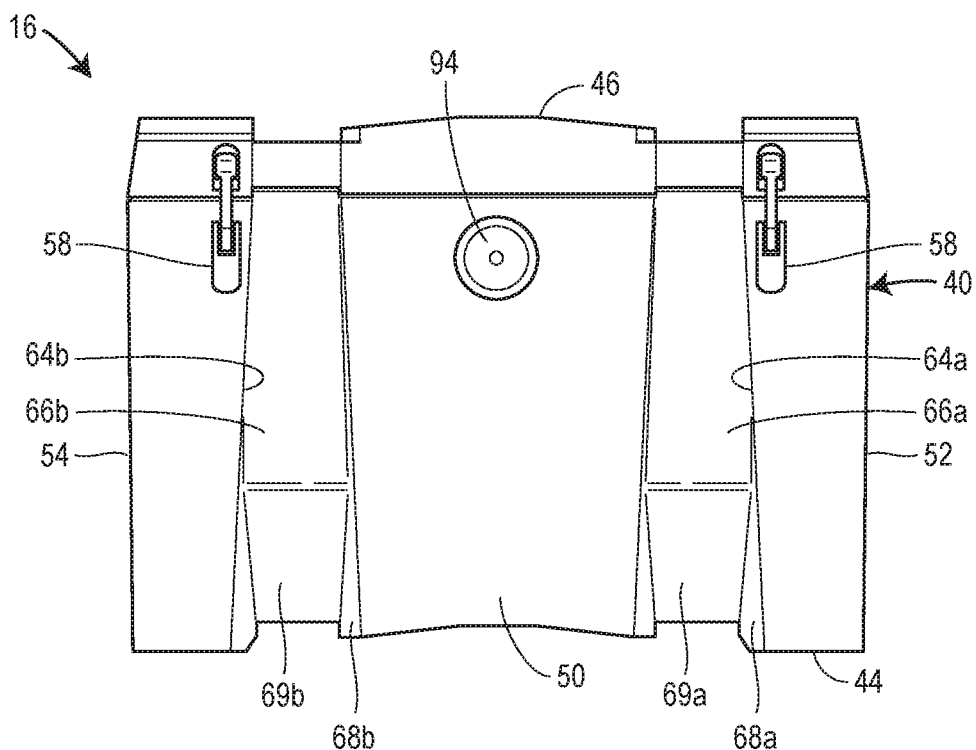
FIG. 3 is a front plan view of the tote depicted in FIG. 2.

Turning to FIGS. 2-8 and 10, the tote 16 may include a container 40 having a plurality of walls enclosing an internal volume 42. The plurality of walls may define an exterior of the container 40 and may include: a bottom wall 44, a top wall 46, a rear wall 48, a front wall 50 extending generally in a vertical direction between the bottom wall 44 and the top wall 46, a first sidewall 52 extending generally in a horizontal direction between the front wall 50 and the rear wall 48, and a second sidewall 54 extending generally in the horizontal direction between the front wall 50 and the rear wall 48. When the tote 16 is disposed on the ground, as illustrated in FIG. 2, the bottom wall 44 may face in a downward vertical direction toward the ground and/or may be parallel to the ground. The exterior surfaces of each of the bottom wall 44, the top wall 46, the rear wall 48, the front wall 50, the first sidewall 52, and the second sidewall 54 may be define a plane with one or more groove or channels. Furthermore, each of the walls 44-54 may be arranged perpendicular, or substantially perpendicular, to its adjacent walls such that the container 40 takes the form of a rectangular box. In other embodiments, the container 40 may have a different exterior shape, including a cube, a hemisphere, a cylinder, a cone, a pyramid, or any other suitable three-dimensional shape.

The container 40 may be constructed of a light and durable material that inhibits the egress and/or ingress of moisture, chemicals, or other environmental contaminants. Suitable materials for the container 40 include, but are not limited to, plastic, metal (e.g., aluminum), composites, laminates, or any combination thereof. Furthermore, the material chosen for the container 40 may be a recyclable material whose impact on the environment may be minimal. In some embodiments, the container 40 may have a width W, a length L, and/or a height H which is less than approximately (e.g., ±10%) 4.0 feet, or 3.5 feet, or 3.0 feet, or 2.5 feet, or 2.0 feet. In some embodiments, the width W may be greater than the length L and/or greater than the height H to ensure that the container 40 is laterally stable when carried by the loading machine 12.

Figure 4:
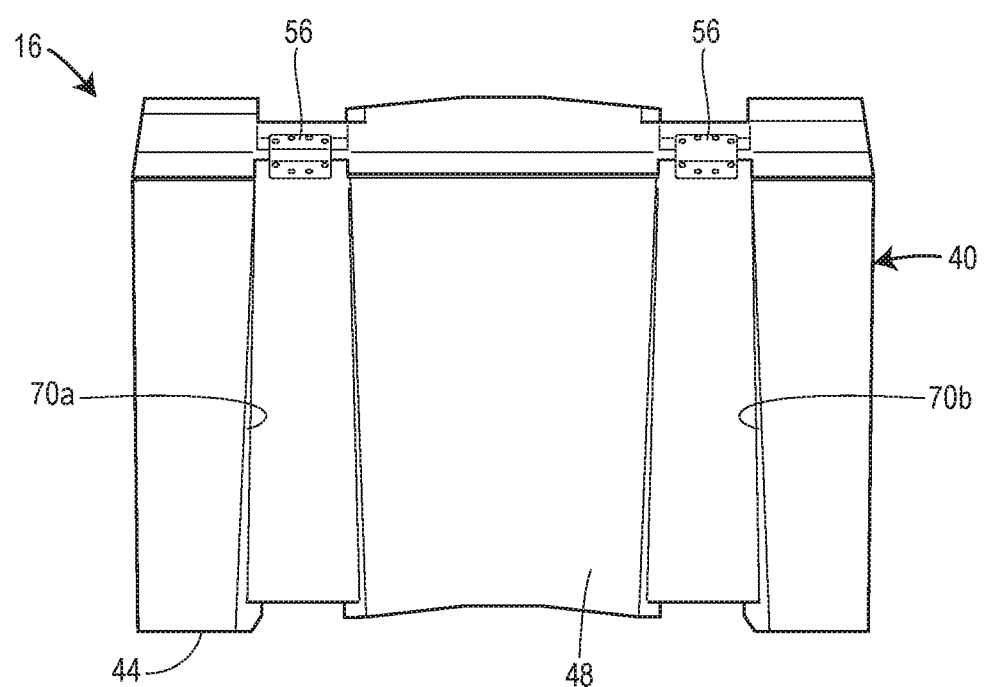
FIG. 4 is a rear plan view of the tote depicted in FIG. 2.
Figure 5:
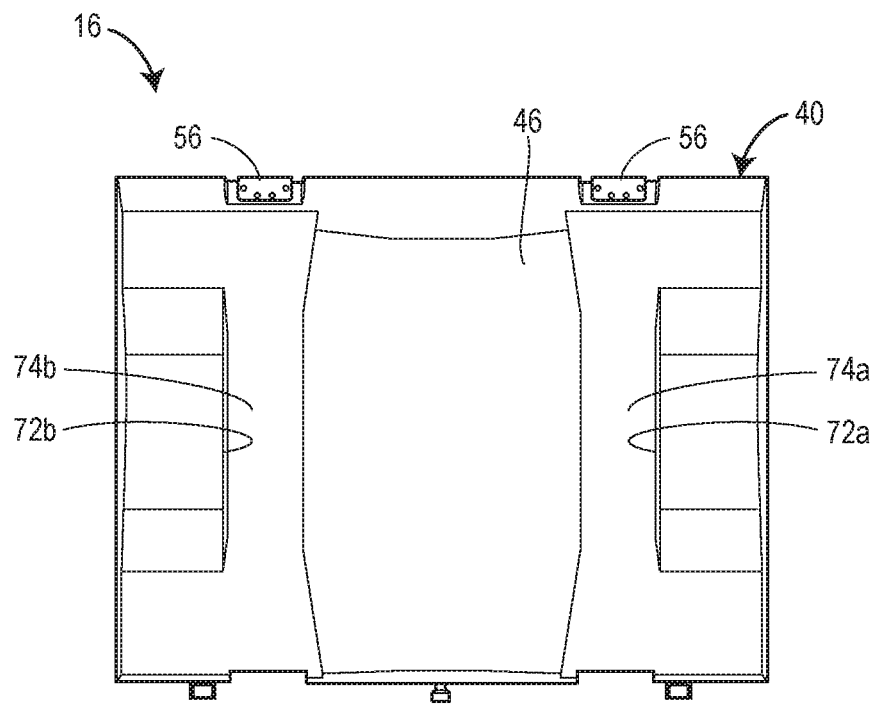
FIG. 5 is a top plan view of the tote depicted in FIG. 2.
Figure 6:
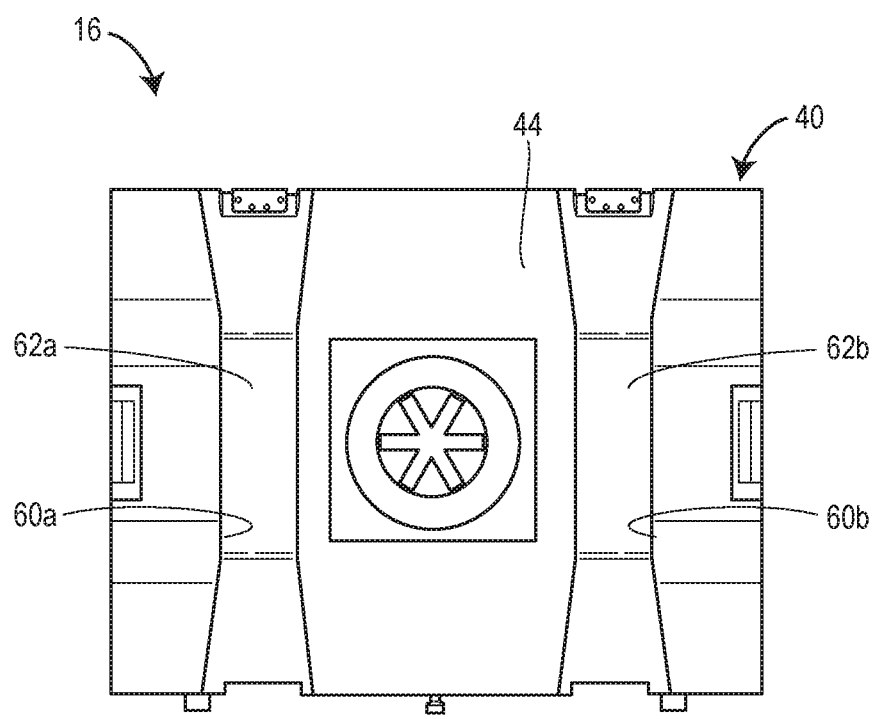
FIG. 6 is a bottom plan view of the tote depicted in FIG. 2.
Figure 7:
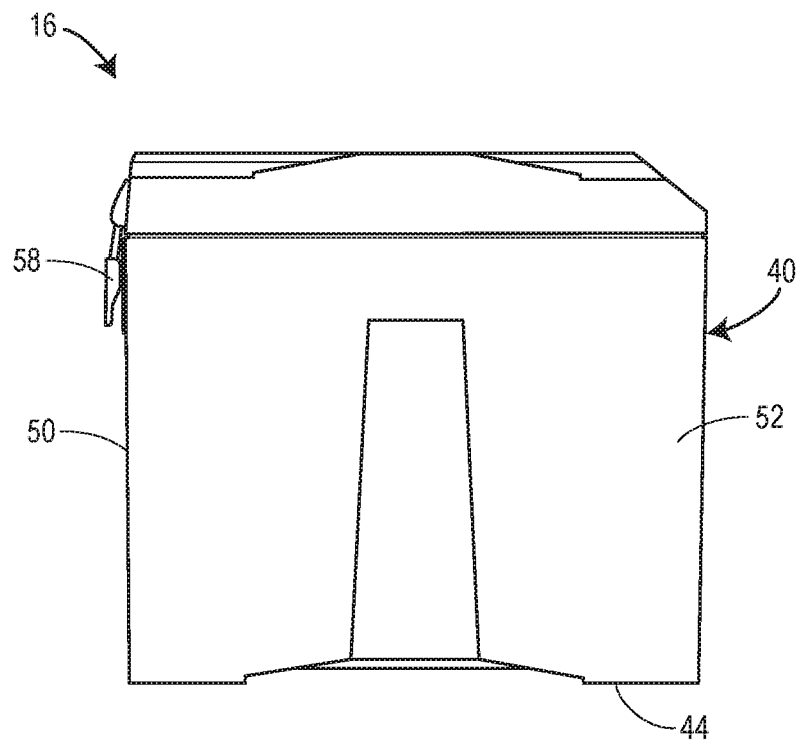
FIG. 7 is a left plan view of the tote depicted in FIG. 2.
Figure 8:
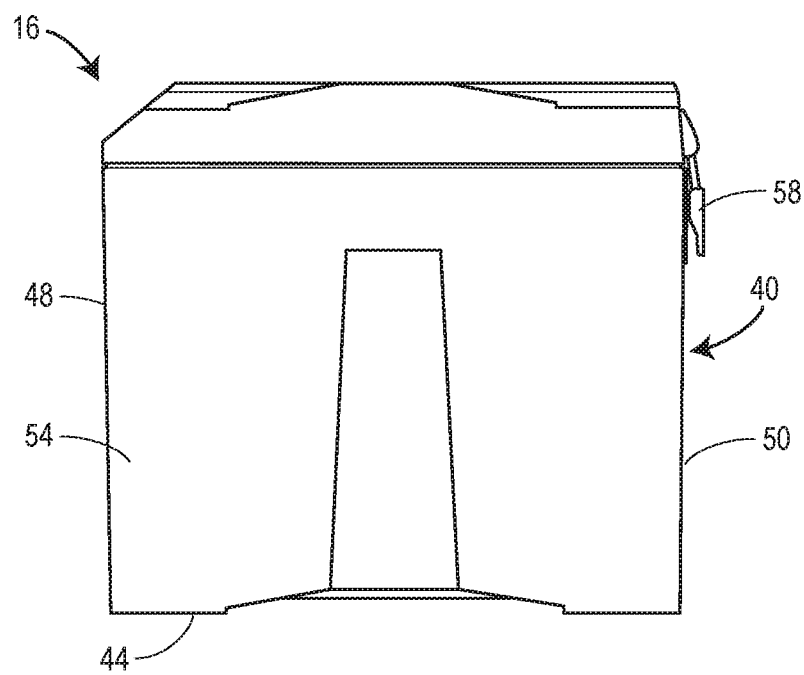
FIG. 8 is a right plan view of the tote depicted in FIG. 2.

Referring to FIGS. 2 and 4, the top wall 46 may be pivotably (e.g., rotationally) connected to the rear wall 48 by one or more hinges 56. Accordingly, an operator may rotate the top wall 46 in a counterclockwise direction to open the container 40 and fill the internal volume 42 with the de-icing material. On the front side of the top wall 46, one or more latches 58 may be provided for locking the top wall 46 to the front wall 50. In some embodiments, latches may also be provided on lateral sides of the top wall 46 to lock the top wall 46 to the first sidewall 54 and/or the second sidewall 56. By securing the top wall 46 to the rest of the container 40, the latches 58 may prevent the top wall 46 from inadvertently swinging open when the tote 16 is lifted and/or moved by the loading machine 12. Furthermore, the latches 58 may prevent the ingress of water and other environmental elements by providing a tight fit between the top wall 46 and the upper ends of the walls 48, 50, 52, and 54. To further promote sealing at the interface between the top wall 46 and the remainder of the container 40, a gasket or O-ring (not illustrated) may be provided at the underside of the top wall 46 and may follow the outer peripheral edge of the top wall 46. In still further embodiments, the latches 58 may be omitted and instead the container 40 may be configured to receive the top wall 46 via a snap-fit, press-fit, or interference-fit connection. Also, in some embodiments, the latches 58 may incorporate a lock (e.g., a key lock or pin pad) for preventing unauthorized individuals from opening the container 40.

With continued reference to FIGS. 2-8, each of the walls 44-54 may include one or more grooves or channels for receiving one or more lift arms of the spreader 14. The sidewalls of these grooves may constrain lateral movement of the lift arms relative to the container 40, thereby facilitating stable transport of the tote 16. The bottom wall 44 may include two generally parallel grooves 60a and 60b, each of which may possess a trough defining a respective lift arm engaging surface 62a or 62b. The grooves 60a and 60b each may extend from the front wall 50 to the rear wall 48. The width of each of the grooves 60a and 60b may progressively increase as one moves toward the front wall 50. As such, each of the grooves 60a and 60b may include a mouth that guides a respective lift arm into the groove 60a or 60b.

The front wall 50 may also include two generally parallel grooves 64a and 64b, each of which may possess a trough defining a respective lift arm engaging surface 66a or 66b. The grooves 64a and 64b may each extend from the bottom wall 44 to the top wall 46. Furthermore, the grooves 64a and 64b may intersect with, respectively, the grooves 60a and 60b. The depth of each of the grooves 60a, 60b, 64a, and 64b may progressively increase as one moves toward the corner between the bottom wall 44 and the front wall 50. As a result, a first chamfer 68a may be formed at the intersection between the grooves 60a and 64a, and a second chamfer 68b may be formed at the intersection between the grooves 60b and 64b. Each of the first and second chamfers 68a and 68b may define a respective lift arm engaging surface 69a or 69b. These surfaces may be angled to match an angle of a corresponding angled portion of a lift arm of the spreader 14. Positioning the angled portions of the lift arms to engage the first and second chamfers 68a and 68b may inhibit lateral movement of the container 40 relative to the spreader 14. The rear wall 48 may also include two generally parallel grooves 70a and 70b, each of which may intersect with the grooves 60a and 60b, respectively.

Grooves 72a and 72b, which are generally parallel to each other, may also be formed in the top wall 46. Each of the grooves 72a and 72b may have a trough defining a respective lift arm engaging surface 74a or 74b. The grooves 72a and 72b may wrap around the top front edge of the top wall 46 so that the grooves 72a and 72b intersect, respectively, with the grooves 64a and 64b. Although the illustrated embodiment does not include chamfers formed at the intersection of the grooves 64a and 72a and the intersection of the grooves 64b and 74b, alternative embodiments may include chamfers at these intersections.

Because they are each located on a different face of the container 40, the lift arm engaging surfaces 62a and 62b may be non-parallel to the lift arm engaging surfaces 66a and 66b, which, in turn, may be non-parallel to the lift arm engaging surface 74a and 74b.

In alternative embodiments, one or all of the grooves 60a, 60b, 64a, 64b, 72a, and 72b, or any combination thereof, may be omitted, and the lift arms of the spreader 14 may engage the planar exterior surfaces defined by the bottom wall 44, the top wall 46, and/or the front wall 50. In still further alternative embodiments, tubular lift rails may be mounted on the first and/or second sidewalls 52 and 54 and may be configured to receive respective lift arms of the spreader 14, thereby forming to form a mated connection.

Referring back to FIG. 2, an opening 76 may extend through the front wall 50 and communicate with the internal volume 42. The opening 76 may provide a pathway for the de-icing material to be transferred from the internal volume 42 to the spreader 14. A central axis of the opening 76 may be aligned with a central axis of an outlet 110 of the internal volume 42. Furthermore, in use, the central axis of the opening 76 may be aligned with a central axis of an inlet 112 of the spreader 14, as described below in more detail. The opening 76 may have a circular cross-sectional shape with an inner diameter D1, or any other suitable cross-sectional shape.

Still referring to FIG. 2, a brush 78 including a plurality of bristles 80 may be aligned along the central axis of the opening 76 and/or positioned inside the opening 76. Generally speaking, the brush 78 may function as a closure member that selectively permits transfer of the de-icing material from the container 40 to the inlet 112 of the spreader 14. In the present embodiment, this functionality may be provided by the bristles 80, which may elastically deform when loaded to permit the de-icing material to pass through the brush 80. As described below in more detail, an agitating member 140 of the spreader 14 may be inserted into the opening 76, through the brush 80, and into the internal volume 42. Rotation and/or vibration of the agitating member 140 may exert a downward force on the de-icing material so that the de-icing material is pulled or guided through the outlet 110 and into engagement with the brush 78. As a result, the de-icing material may exert a load on the bristles 80 of the brush 78 causing them to elastically deform and create temporary openings in the brush 78. These temporary openings may allow the de-icing material to pass through the brush 78. In this way, the brush 78 selectively permits transfer of the de-icing material from the container 40 to the spreader 14 in response to the de-icing material exerting a downward force on the bristles 80 of the brush 78.

In some embodiments, the bristles 80 of the brush 78 may deform to permit passage of the de-icing material solely as a result of the weight of the de-icing material, regardless of whether the agitating member 140 exerts a downward force on the de-icing material.

When the spreading procedure is finished or suspended, the agitating member 140 may cease rotating and/or vibrating. During stoppage of the agitating member 140, the bristles 80 of the brush 78 return to their original un-deformed position, or at least proximate to their original un-deformed position. This action may temporarily close the openings formed in the brush 78. With the bristles 80 in their original un-deformed positions, the bristles 80 may act as a barrier that inhibits leakage of the de-icing material through the opening 76. In some embodiments, the bristles 80 may completely prevent leakage of the de-icing material through the opening 76 during stoppage of the agitating member 140. So configured, the brush 78 advantageously may prevent leakage of the de-icing material from the tote 16 when the loading machine 12 carries the tote 16 but does not operate the spreader 14 to spread the de-icing material. This may allow the operator to carry the tote 16 to an application site without leaking the de-icing material along the way.

Figure 9:
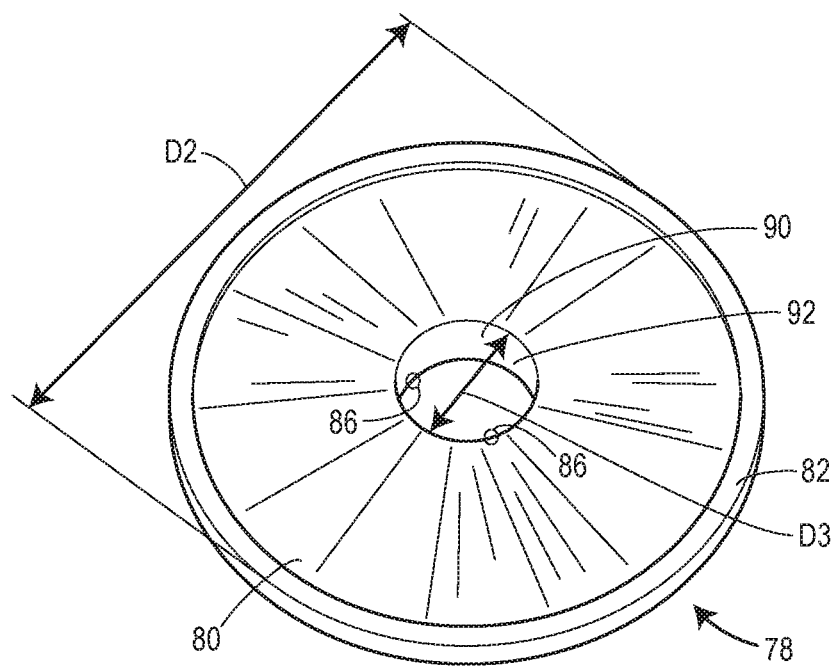
FIG. 9 is perspective view of one embodiment of a brush in accordance with principles of the present disclosure.

FIG. 9 illustrates an enlarged view of the brush 78. The bristles 80 may extend radially inwardly from an outer peripheral rim 82 of the brush 78. The outer peripheral rim 82 may be formed of a rigid material such as steel, whereas the bristles 80 may be formed of a flexible material such as nylon. As such, the bristles 80 may be able to bend or elastically deform relative to the outer peripheral rim 82. Furthermore, the outer peripheral rim 82 may be circular, triangular, square, rectangular, or any other suitable shape. In the present embodiment, the outer peripheral rim 82 is circular such that the brush 78 takes the form of a disk. In one embodiment, an outer diameter D2 of the circular outer peripheral rim 82 is approximately (e.g., ±10%) 4.0 inches, or lesser or greater. The outer diameter D2 is greater than or equal to the inner diameter D1 of the opening 76 such that the brush 78 covers then entirety of the opening 76. In some embodiments, an inwardly protruding annular ridge may be formed inside the opening 76 to provide a stop for the brush 78 when it is inserted into the opening 76 during installation. In some embodiments, the opening 76 may receive the brush 78 via a snap-fit, press-fit, or interference-fit connection. Alternatively, or additionally, one or more fasteners may be provided to secure the outer peripheral rim 82 of the brush 78 to an annular wall surrounding the opening 76.

Referring still to FIG. 9, each of the bristles 80 may extend from the outer peripheral rim 82 in an inward radial direction and terminate at a respective free end 86. The free ends 86 of the bristles 80 may be arranged to define a periphery 90 of a hole 92 that extends through the brush 78. The agitating member 140 may extend through the hole 92 when the spreader 14 engages the tote 16. The inner diameter D3 of the hole 92 may be approximately (e.g., ±10%) 1.0 inches, or lesser or greater. The inner diameter D3 of the hole 92 may be equal to, or slightly less than, an outer diameter of the agitating member 140 so that free ends 86 of the bristles 80 press against the agitating member 140.

In some embodiments, the brush 78 may be configured in a similar manner as the brush described in U.S. Patent Application Publication No. 2015/0284922, which is hereby incorporated by reference in its entirety for all purposes.

Returning to FIG. 2, in addition to the brush 78, a removable plug 94 may be positioned in the opening 76. The removable plug 94 may seal close the opening 76 so that moisture and other environmental elements stopped from entering the internal volume 42 and degrading the de-icing material prior to use. In some embodiments, the removable plug 94 may be received in the opening 76 via a snap-fit, press-fit, or interference-fit connection. Annular ribs or protrusions may be formed on the exterior of the removable plug 94 to promote sealing between the removable plug 94 and the annular wall defining the opening 76. In some embodiments, the combination of the removable plug 94 and the brush 78 may constitute a closure member. Furthermore, in some embodiments, the brush 78 may be omitted.

Figure 10:
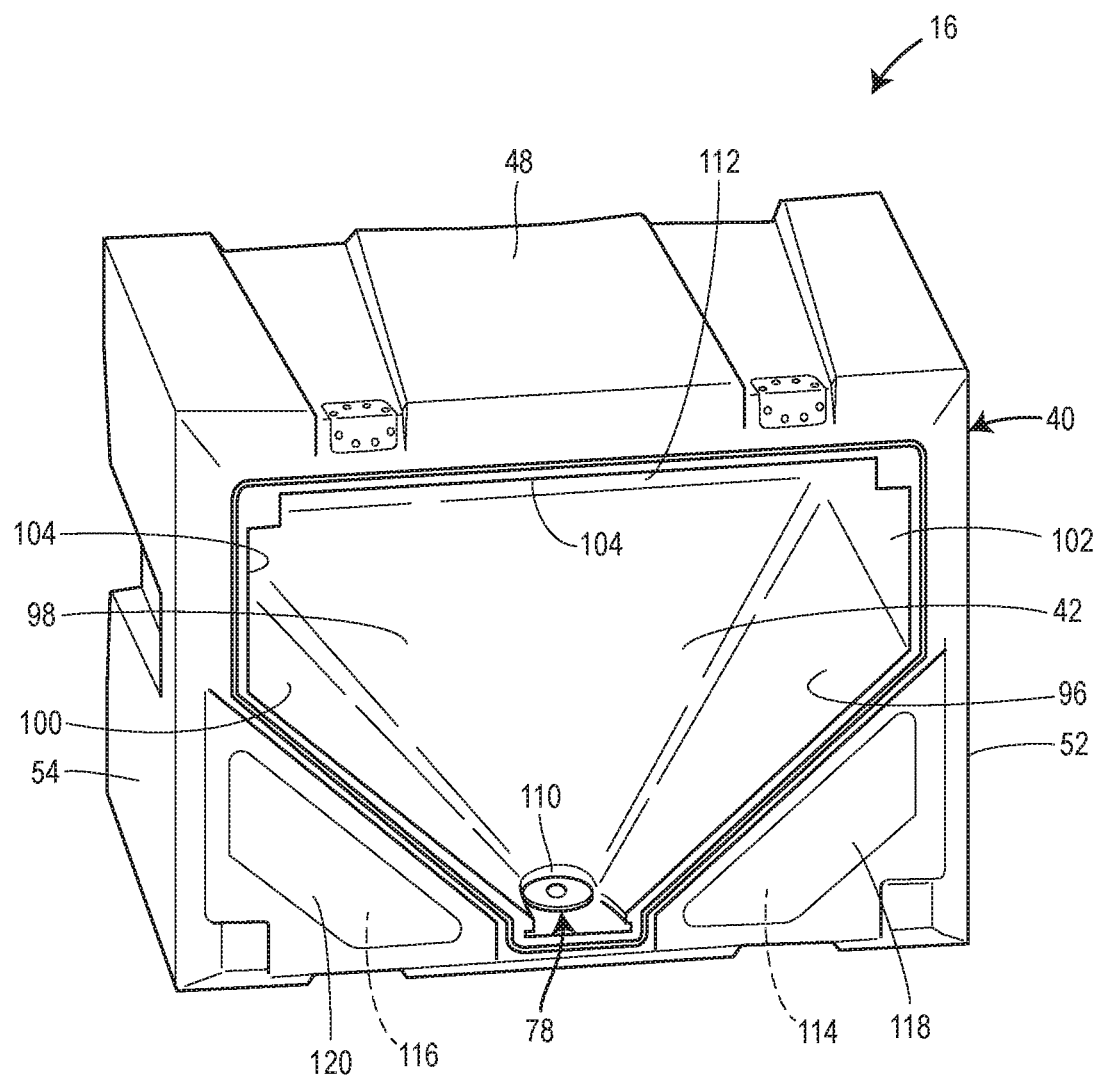
FIG. 10 is a top perspective view of the tote depicted in FIG. 2 with the top wall omitted.

With reference to FIG. 10, the structure and function of the internal volume 42 will now be described. It is noted that the top wall 46 of the tote 16 is omitted in FIG. 10 for discussion purposes. Generally speaking, the internal volume 42 functions as both: (i) a cavity for storing the de-icing material prior to a spreading operation, and (ii) a hopper for funneling the de-icing material toward the spreader 14 during the spreading operation. As depicted in FIG. 10, the internal volume 42 may be defined by the interior walls 96, 98, 100, 102, 104, and 106 of the container 40. At least the interior walls 96, 98, and 100 may be angled or curved to define a funneling portion of the internal volume 42 which tapers in a direction toward the opening 76. An internal dimension (e.g., width) of the funneling portion of the internal volume 42 may progressively decrease traveling in a direction toward the opening 76. A non-funneling portion of the internal volume 42 may be defined by the interior walls 102, 104, and 106 and may have a constant width or other internal dimension which does not taper. When the top wall 46 is connected to the container 40, it may also define a side of the internal volume 42.

In the present embodiment, the funneling portion of the internal volume 42 may take the shape of an inverted pyramid, with a flattened side defined by the top wall 46. In other embodiments, the funneling portion of the internal volume 42 may take the shape of an inverted cone, or any other shape the de-icing material toward the opening 76 when the tote 16 is oriented with the front wall 50 facing the ground.

The portion of the internal volume 42 closest to the opening 76 may constitute the outlet 110 of the internal volume 42; whereas the portion of the internal volume 42 closest to the top wall 46 may constitute the inlet 112 of the internal volume 42.

In some embodiments, the internal volume 42 may be configured to hold a quantity of de-icing material within a range of approximately (e.g., ±10%) 0.5-1.5 cubic yards, or 0.5-1.0 cubic yards, or 0.5-0.8 cubic yards, or may be configured to hold a quantity of de-icing material equal to or less than approximately (e.g., ±10%) 0.5 cubic yards. Filling the tote 16 with these quantities, or similar quantities, of the de-icing material may help minimize the impact on the maneuverability of the loading machine 12 when the tote 16 is carried by the by the loading machine 12.

Still referring to FIG. 10, the interior wall 96 may be arranged at an angle relative to the first sidewall 52 and the front wall 50; the interior wall 98 may be arranged at an angle relative to the rear wall 48 and the front wall 50; and the interior wall 100 may be arranged at an angle relative to the second sidewall 54 and the front wall 50. A first auxiliary storage compartment 114 may be defined between the interior wall 96, the first sidewall 52, and the front wall 50. Additionally, a second auxiliary storage compartment 116 may be defined between the interior wall 100, the second sidewall 54, and the front wall 50. The first and second auxiliary storage compartments 114 and 116 may be isolated from the internal volume 42, respectively, by the interior walls 96 and 100. Also, as shown in FIG. 10, the first and second auxiliary storage compartments 114 and 116 may be covered by, respectively, first and second doors 118 and 120 pivotably connected to the top wall 46.

In the embodiment illustrated in FIG. 10, the interior walls 96, 98, 100, 102, 104, and 106 are separate from the bottom wall 44, the top wall 46, the rear wall 48, the front wall 50, the first sidewall wall 52, and the second sidewall 54. However, in other embodiments, one or more of the interior walls 96, 98, 100, 102, 104, and 106 may be integrally formed with one or more of the bottom wall 44, the top wall 46, the rear wall 48, the front wall 50, the first sidewall wall 52, and the second sidewall 54.

Figure 11:
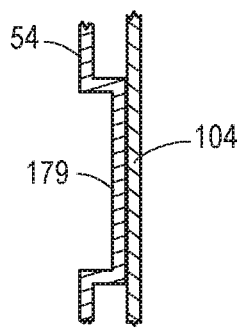
FIG. 11 is a schematic cross-sectional view of one embodiment of a reinforcing groove in accordance with principles of the present disclosure.

In some embodiments, one or more of the exterior walls 44-54 and/or one or more of the interior walls 96-106 may include one or more reinforcing grooves to prevent or inhibit the outward bulging of the exterior walls 44-54 and/or interior walls 96-106 due to the weight of the de-icing material. The one or more reinforcing grooves may be generally parallel to the vertical direction when the tote 16 is placed on the ground G. FIG. 11 illustrates a cross-sectional view of one embodiment of a reinforcing groove 179 formed in the second sidewall 54. The reinforcing groove 179 may extend inwardly from the second sidewall 54 toward the interior wall 104, and may even contact the interior wall 104. If the weight of the de-icing material causes the interior wall 104 to bulge outwardly and press against the second sidewall 54, the reinforcing groove 179 may prevent or inhibit the second sidewall 54 from also bulging outwardly. Alternatively, or additionally, a reinforcing groove may be formed in the interior wall 104 and extend toward the second sidewall 54 so that the interior wall 104 is stiffened. In some embodiments, each reinforcing groove formed in one of the exterior walls 44-54 may have a counterpart reinforcing groove formed in one of the interior walls 96-106, such that the reinforcing grooves are arranged in opposition to each other and/or contact each other. Furthermore, while FIG. 11 illustrates a single reinforcing groove formed in a single wall, any number of reinforcing grooves may be formed in any combination of the exterior walls 44-54 and/or the interior walls 96-106.

Referring now to FIGS. 12-15 and 18, one embodiment of the spreader 14, which may be used in combination with the tote 16, will be described. In general, the spreader 14 provides a means for lifting and/or rotating the tote 16 with the loading machine 12, as well as means for discharging the de-icing material from the tote 16 onto the ground in a dispersed manner. The spreader 14 may include a frame 130 configured to be removably connected to the mounting plate 28 and/or the boom 22 of the loading machine 12. The frame 130 may include one or more hydraulic lines 132 which can be connected to the hydraulic lines 30 of the loading machine 12. This connection may enable the spreader 14 to be powered and/or controlled by the hydraulics of the loading machine 12. In the present embodiment, a plurality of nuts and bolts may provide a rigid connection between a rear surface 131 of the frame 130 and the mounting plate 28. Accordingly, the frame 130 may move together with the mounting plate 28 when the mounting plate 28 is raised, lowered, and/or rotated by the loading machine 12. In other embodiments, the frame 130 may be configured to rotate and/or translate relative to the mounting plate 28 and/or the boom 22.

Figure 15:
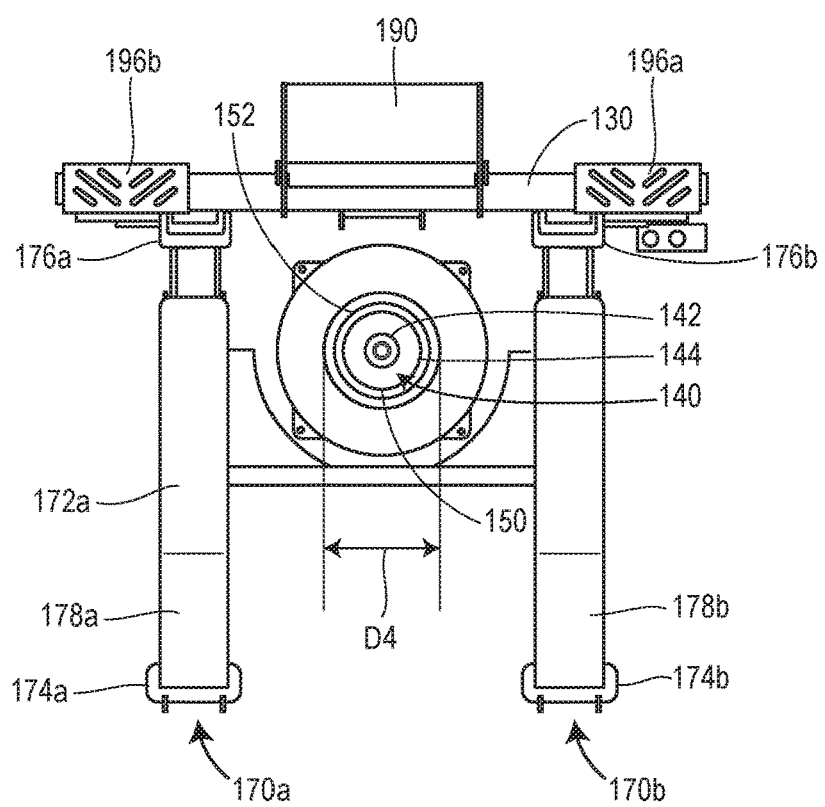
FIG. 15 is a top plan view of the spreader illustrated in FIG. 12.

The spreader 14 additionally includes the agitating member 140, which in the present embodiment is configured as an auger. Alternative embodiments of the agitating member 140 can be configured differently, for example, as a rotatable shaft with non-helical fan blades, or as a whisk, or as an elongate vibrating member. In the present embodiment, the agitating member 140 includes a blade 142 and a rotatable shaft 144 which rotates about a rotational axis A1. The blade 142 is a helical screw blade. In other embodiments, the blade 142 may have a tapered, conical, or any other suitable shape. The blade 142 protrudes outwardly from a portion of the rotatable shaft 144 to be positioned inside the opening 76 and/or internal volume 42 of the tote 16. Rotation of the blade 142 exerts a downward force on the de-icing material that pulls or directs the de-icing material toward the opening 76. As depicted in FIG. 15, the rotatable shaft 144 may be hollow so that a drive shaft 166 of a motor 168 can be inserted into the rotatable shaft 144. The drive shaft 166 may be removably connected to the rotatable shaft 144 by screws or pins to facilitate assembly and disassembly of the spreader 14.

Figure 12:
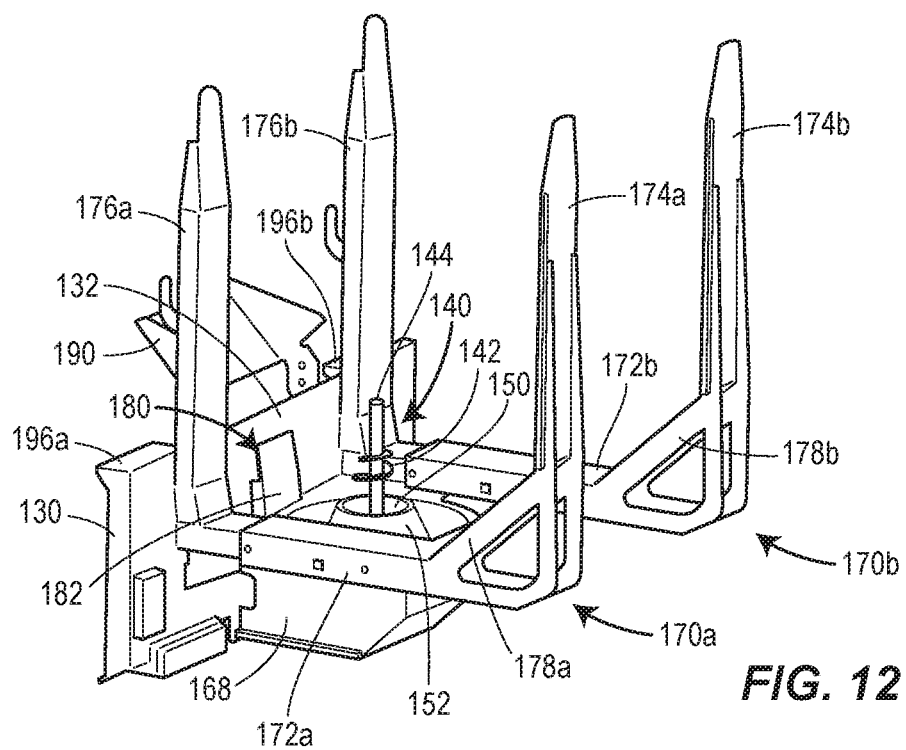
FIG. 12 is a side perspective view of one embodiment of a spreader in accordance with principles of the present disclosure.
Figure 13:
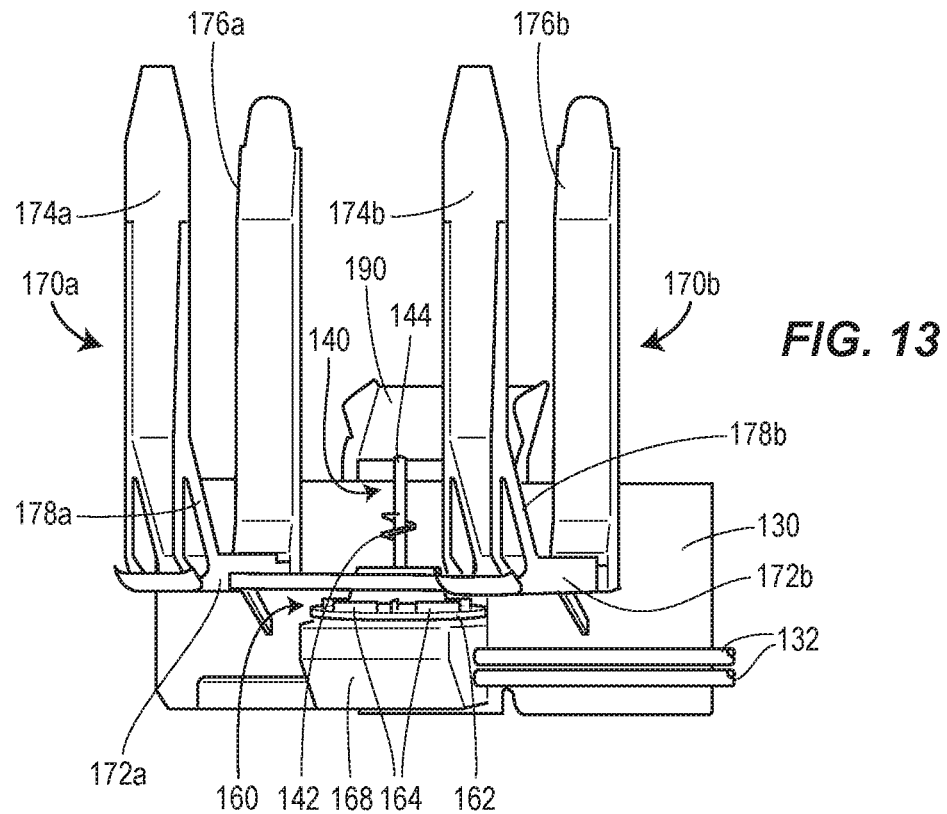
FIG. 13 is another side perspective view of the spreader illustrated in FIG. 12.
Figure 18:
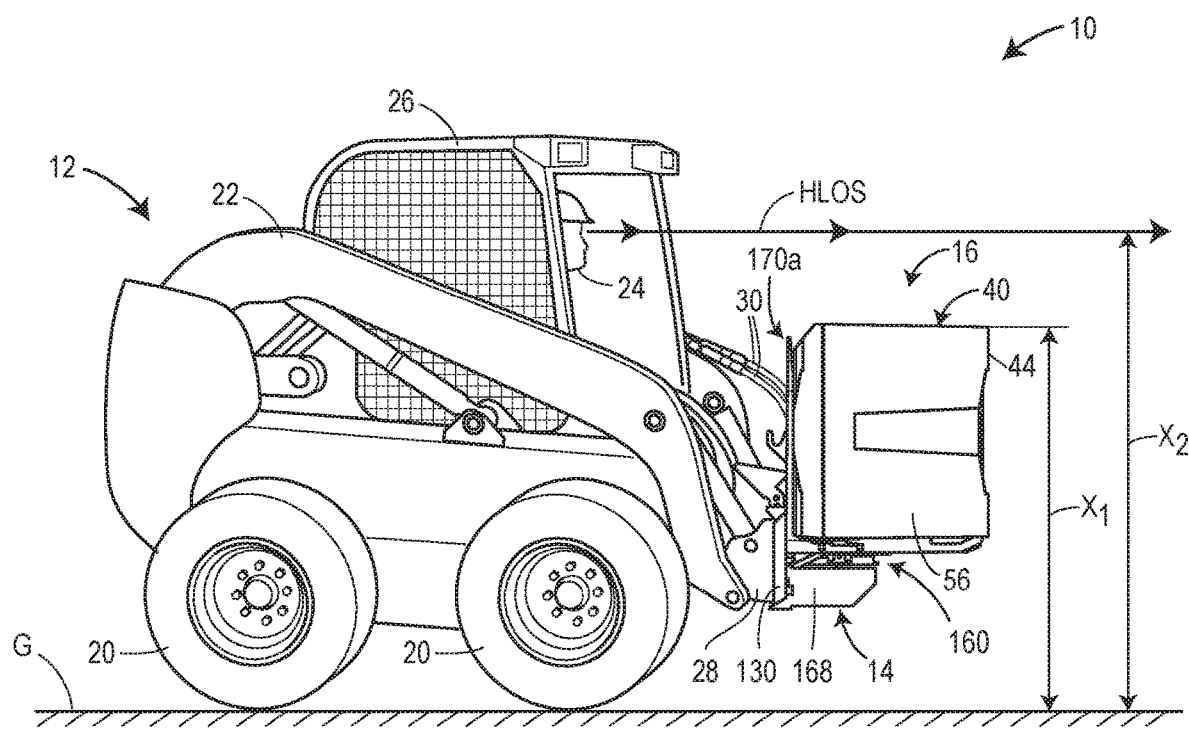
FIG. 18 illustrates a side perspective view of the spreading system of FIG. 1 during a spreading operation.

Referring to FIGS. 12, 13, and 15, the spreader 14 may possess an inlet 150 defined by an upwardly extending annular protrusion 152. An outer diameter D4 of the upwardly extending annular protrusion 152 may be slightly smaller than or equal to the inner diameter D1 of the opening 76 of the container 40 such that the upwardly extending annular protrusion 152 can be inserted into the opening 76. When the tote 16 is assembled to the spreader 14, as shown in FIG. 18, the rotatable shaft 144 of the agitating member 140 extends in an upward direction through the inlet 150 and into the opening 76 of the container 40. When the tote 16 is not assembled to the spreader 14, as shown in FIGS. 1 and 12-15, the rotatable shaft 144 of the agitating member 140 extends through the inlet 150 and terminates in open space such that the terminal end of the agitating member 140 is exposed.

Figure 14:
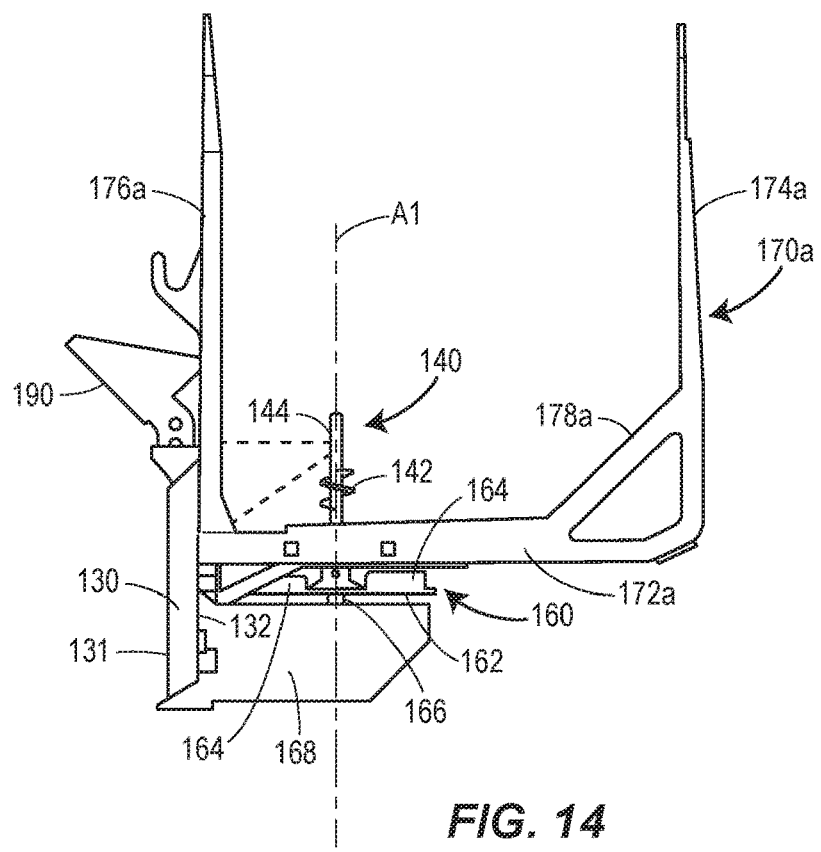
FIG. 14 is a left plan view of the spreader illustrated in FIG. 12.

Referring to FIGS. 13 and 14, the spreader 14 may additionally include a discharge mechanism 160. The discharge mechanism 160 is configured to selectively discharge the de-icing material onto the ground, for example, in response to hydraulic commands from the operator of the loading machine 12. In some embodiments, the discharge mechanism 160 may include a spinner plate 162 positioned below the inlet 150 so that the de-icing material removed through the opening 76 of the tote 16 falls onto the spinner plate 162. The rotatable shaft 144 of the agitating member 140 passes through a hole in the center of the spinner plate 162. In at least one embodiment, the rotatable shaft 144 is fixed to the hole in the spinner plate 162 such that the spinner plate 162 rotates together with the rotatable shaft 144. In other embodiments, the spinner plate 162 may rotate independently of the rotatable shaft 142. As illustrated in FIGS. 13 and 14, the spinner plate 162 may have a generally circular shape and possess a plurality of upright panels 164. Rotation of the upright panels 164 may propel the de-icing material in a radial pattern, thereby spreading the de-icing material over a relatively large area of the ground.

In the illustrated embodiment, the spreader 14 may not include a hopper. Instead, the tote 16 may function as a hopper for channeling the de-icing material into the inlet 150 of the spreader 14, as discussed above. In other embodiments, the spreader 14 may include a secondary hopper which supplements the hopper provided by the tote 16.

With continued reference to FIGS. 12-15, the motor 168 may be mounted to the frame 130 beneath the spinner plate 162. The motor 168 may be selectively supplied with hydraulic pressure from the loading machine 12 via the hydraulic lines 132 in response to operator commands. In alternative embodiments, the motor 168 may be powered with electricity from the loading machine 12. The motor 168 may rotate the drive shaft 166 about the rotational axis A1, which in turn rotates the rotatable shaft 144 about the rotational axis A1. The motor 168 may be controlled by the operator to rotate the drive shaft 166 at different rotational speeds. While the motor 168 of the present embodiment is aligned with the rotatable shaft 144, alternative embodiments can be arranged differently, for example, with the motor 168 offset from the rotatable shaft 144 and rotationally connected to the rotatable shaft 144 via a gear mechanism.

Still referring to FIGS. 12-15, the spreader 14 includes a first lift arm 170a and a second lift arm 170b configured to lift and manipulate the tote 16. The first lift arm 170a and the second lift arm 170b may be located on opposite sides of the discharge mechanism 160. The first lift arm 170a may include a support member 172a, a first stop member 174a, and a second stop member 176a. During a spreading operation, the support member 172a may bear the weight of the tote 16 whereas the first and second stop members 174a and 176a may inhibit or prevent forward and/or rearward tipping of the tote 16 by straddling the tote 16 during the spreading operation (see FIG. 18). As seen in FIG. 14, the first and second stop members 174a and 176a each may extend in a first general direction away from the discharge mechanism 160, and the support member 172a may extend in a second general direction away from the frame 130. The first and second stop members 174a and 176a may be generally parallel to each other, and generally perpendicular to the support member 162a. Furthermore, the first stop member 174a may be formed by an upturned end of the support member 172a. Furthermore, the first and second stop members 174a and 176a may be generally parallel to the rotational axis A1 of the agitating member 140. Accordingly, as seen in FIG. 18, when the rotational axis A1 of the agitating member 140 is arranged perpendicular to the ground G, the first and second stop members 174a and 176a may be perpendicular to the ground G, whereas the support member 172 may be parallel to the ground G. In some embodiments, each of the support member 172a, the first stop member 174a, and the second stop member 176a may define a respective planar surface configured to engage tote 16.

The first stop member 174 and the frame 130 may be arranged on opposite sides of the spreader 14. In some embodiments, the first stop member 174a may define a forward leading edge of the spreader 14 when the frame 130 is attached to the boom 22 of the loading machine 12 and the loading machine 12 moves in a forward direction, as shown in FIG. 1. Furthermore, in some embodiments, the first stop member 174a may be longer than the second stop member 176a, because of the need for the first stop member 174 to be able to lift the tote 16 off the ground.

As shown in FIGS. 12-15, the combination of the support member 172a and the first stop member 174a may define an L-shape; and the combination of the support member 172a and the second stop member 176a may define a mirrored L-shape. Together, the support member 172a, the first stop member 174a, and the second stop member 176a may define a U-shape. Furthermore, in some embodiments, the second stop member 176a may be omitted such that the first lift arm 170a has an L-shape instead of a U-shape.

Referring to FIG. 18, the support member 172a of the first lift arm 170a may be received in the groove 64a in the front wall 50 of the container 40 such that the support member 172a engages the lift arm engaging surface 66a. The first stop member 174a of the first lift arm 170a may be received in the groove 60a in the bottom wall 44 of the container 40 such that the first stop member 174a engages the lift arm engaging surface 62a. The second stop member 176 of the first lift arm 170a may be received in the groove 72a in the top wall 46 of the container 40 such that the second stop member 176a engages the lift arm engaging surface 74a. In some embodiments, the distance separating the first and second stop members 174a and 176a may be greater than the height H of the container 40 such that the first and second stop members 174a and 176a do not simultaneously engage the container 40. In other embodiments, the distance separating the first and second stop members 174a and 176a may be equal than the height H of the container 40 such that the first and second stop members 174a and 176a are able to simultaneously engage the container 40.

Referring back to FIGS. 12-15, the first lift arm 170a may additionally include an angled strut 178a which extends at an angle between the support member 172a and the first stop member 174a. As seen in FIG. 18, the angled strut 178a may be received in the first chamfer 68a of the container 40. This configuration may help prevent lateral movement of the container 40 relative to the spreader 14 during turns performed by the loading machine 12.

The second lift arm 170b is similar to the first lift arm 170a except for its placement on the opposite side of the discharge mechanism 160 and its ability to engage the lift arm engaging surfaces 62b, 66b, and 74b. Elements of the second lift arm 170b which are similar to elements of the first lift arm 170a are designated by the same reference numeral, except the suffix "a" is replaced with the suffix "b". A description of the elements of the second lift arm 170b is omitted in the interest of brevity.

Referring to FIG. 18, the spreader 14 and the tote 16 may be dimensioned so that when the tote 16 is carried by the spreader 14 during a spreading operation, a distance X1 between the ground G and the rear wall 48 is less than a distance X2 between the ground G and the horizontal line of sight (HLOS) of the operator 24 of the loading machine 12. While the distance X1 is also dependent on the vertical position of the boom 22 and the height of the operator 24, the relationship of X1<X2 should hold true at least when the boom 22 is arranged in its lowest vertical position and the operator 24 is of average height for an adult. X1 being less than X2 has the advantage of allowing the operator 24 to see over the top of the tote 16 during the spreading operation. Accordingly, the operator 24 can maneuver the tote 16 to avoid obstacles such as curbs, parked vehicles, potholes, speed bumps, pedestrians, etc. Furthermore, the lack of a large hopper mounted on the spreader 14 means that the vision of the operator 24 may not be obstructed when aligning the first and second lift arms 170a and 170b with their respective grooves in the tote 16 when picking up the tote 16.

Referring back to FIG. 12, in some embodiments, the spreader 14 may include a wedge 180 configured to engage the top wall 46 or lid of the container 40 to secure the top wall 46 in a closed position while the tote 16 is carried by the spreader 14. As such, the wedge 180 may resist the opening of the top wall 46 by, for example, the inertial force of the de-icing material pressing against the inner surface of the top wall 46 during high acceleration driving maneuvers. Accordingly, the wedge 180 may reduce the likelihood of the de-icing material leaking from a loosened top wall 46 during a spreading operation.

FIG. 12 illustrates that the wedge 180 may be positioned between the stop members 176a and 176b, and may protrude inwardly from a front surface 181 of the frame 130 in a direction toward the agitating member 140. Furthermore, the wedge 180 may include an inclined surface 182 or ramp configured to guide or push the tote 16 in a direction toward the stop members 174a and 174b when the top wall 46 of the container 40 slides along the inclined surface 182, which occurs when the spreader 14 is used to pick up the tote 16. As a result, the wedge 180 may push the container 40 against the stop members 174a and 174b, thereby holding the top wall 46 tightly against the remainder of the container 40.

The inclined surface 182 may be angled such that a perpendicular distance between the inclined surface 182 and the agitating member 140 (or a perpendicular distance between the inclined surface 182 and one or both of the stopper members 174a and 174b) may gradually decrease when moving in a direction toward the spinner plate 162 and/or motor 168. Accordingly, the top wall 46 may be increasingly tightened against the remainder of the container 40 as the top wall 46 slides over the inclined surface 182 during the pickup of the tote 16 by the spreader 14. Though the wedge 180 may result in a press fit between the tote 16 and the spreader 14, the amount of friction between the wedge 180 and the top wall 46 may be such that the tote 16 can be dislodged from the spreader 14 by quickly driving the loading machine 12 in a reverse direction and/or shaking the tote 16 side-to-side with the first and second lift arms 170a and 170b arranged substantially parallel to the ground G. Furthermore, the inclined surface 182 may be planar, curved, and/or any other suitable shape. Also, while the present embodiment of the spreader 14 includes a single wedge, other embodiments may include two or more wedges laterally spaced apart from each other.

Still referring to FIGS. 12-15, the spreader 14 may additionally include an adjustable stop member 190 configured to selectively engage the front wall 50 of the container 40 to prevent the rotatable shaft 144 of the agitating member 140 from being inserted through the opening 76 when the spreader 14 is used to pick up the tote 16. In some embodiments, the adjustable stop member 190 may selectively engage the front wall 50 of the container 40 to limit the advancement of the first and second lift arms 170a and 170b over the bottom and top walls 44 and 46 of the container 40 when the spreader 14 is used to pick up the tote 16, and/or prevent the first and second support members 172a and 172b from engaging the front wall 50 of the container 40 when the spreader 14 is used to pick up the tote 16.

As illustrated in FIG. 14, the adjustable stop member 190 may be pivotably (e.g., rotationally) connected to the frame 130, and arranged between the first and second stop members 176a and 176b. The adjustable stop member 190 may be rotated, or otherwise moved, between a non-blocking position (shown in solid lines in FIG. 14) and a blocking position (shown in dashed lines in FIG. 14). In some embodiments, a locking pin or mechanism (not shown) may be used to selectively lock the adjustable stop member 190 in the non-blocking position and/or the blocking position. In the non-blocking position, the adjustable stop member 190 may not impede advancement of the tote 16 into the spreader 14 during pick up. In the blocking position, the adjustable stop member 190 may engage the front wall 50 of the container 40 to prevent or limit further advancement of the tote 16 into the spreader 14. As a result, the adjustable stop member 190 may prevent the agitating member 140 from being inserted through the opening 76 of the container 40. Thus, although the opening 76 may be aligned with the rotational axis A1 of the agitating member 140, the adjustable stop member 190 may cause the mouth of the opening 76 (as well as the front wall 50 of the container 40) to be spaced apart from a terminal end of the rotatable shaft 144 of the agitating member 140. Such an arrangement of the spreader 14 and the tote 16 may be useful if the operator 24 seeks to carry the tote 16 with the spreader 14, without employing the spreader 14 to spread the de-icing material over the ground G. Because the agitating member 140 does not penetrate the opening 76 when the adjustable stop member 190 is arranged in the blocking position, the removable plug 94 may be left in the opening 76, thereby preventing or inhibiting leakage of material while the tote 16 is transported. The illustrated embodiment of the adjustable stop member 190 is configured so that it can be manually moved by the operator 24 or another individual between the blocking and non-blocking positions; however, in other embodiments, movement of the adjustable stop member 190 may be automatically controlled via hydraulics of the loading machine 12.

In some embodiments, the frame 130 may incorporate features making it easier for the operator 24 to climb over the spreader 14 when entering and exiting the cab 26 of the loading machine 12. FIGS. 12 and 15 illustrate that the upper end of the frame 130 includes steps 196a and 196b to provide a place where the operator 24 can place his or her foot when climbing into or out of the cab 26. The upper surface of each of the steps 196a and 196b may be textured and/or have a plurality of slots to improve the grip between the step and the shoe of the operator 24.

Figure 16:
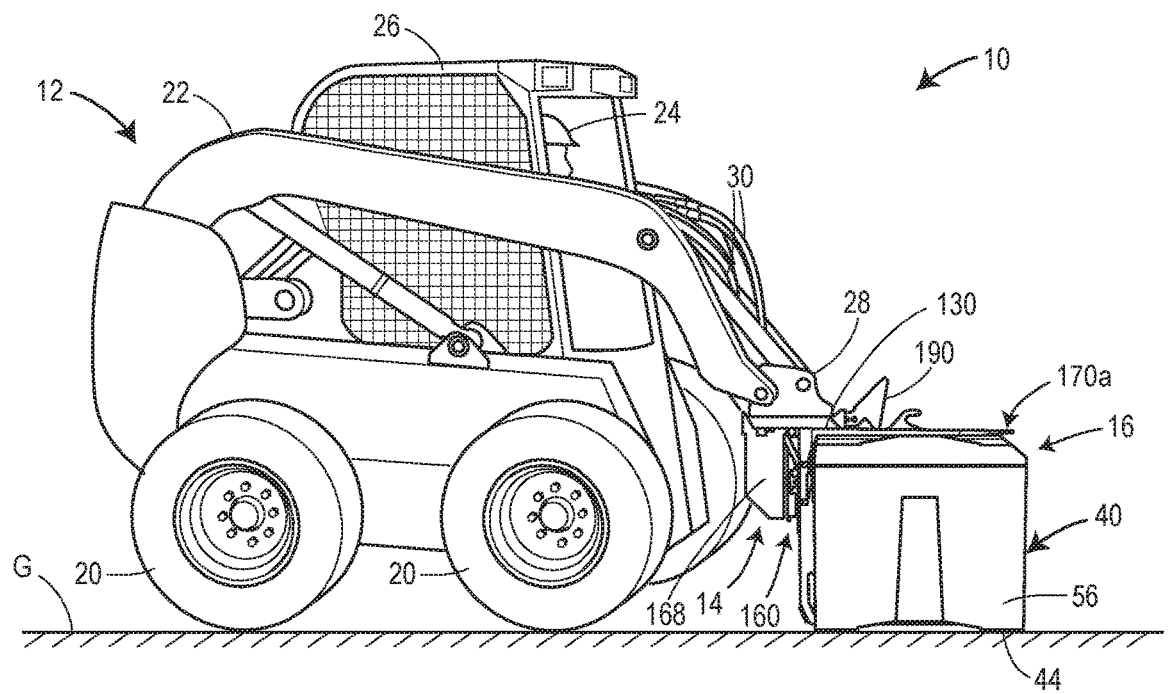
FIG. 16 depicts a side perspective view of the spreading system of FIG. 1 with the spreader initially engaging the tote.

A method of spreading the de-icing material stored in the tote 16 will now be described with reference to FIGS. 1 and 16-18. As a preliminary step, the de-icing material may be stored in one or more totes 16 near or at an application site (e.g., a parking lot). Initially, the operator 24 may remove the removable plug 94 (if included) from the opening 76 of one of the totes 16. Next, the operator 24 of the loading machine 12 may orient the spreader 14 such that the stop members 174a, 174b, 176a, and 176b are substantially parallel to the ground G and extend in a forward direction toward the tote 16 (see FIG. 1). Subsequently, the operator 24 may maneuver the loading machine 12 to align the support member 172a with the lift arm engaging surface 66a, the stop member 174a with the lift arm engaging surface 62a, the stop member 176a with the lift arm engaging surface 74a, the support member 172b with the lift arm engaging surface 66b, the stop member 174b with the lift arm engaging surface 62b, and/or the stop member 176b with the lift arm engaging surface 74b. Next, as seen in FIG. 16, the operator 24 may drive the loading machine 12 in the forward direction toward the tote 16 such that the support member 172a engages the lift arm engaging surface 66a, the stop member 174a engages the lift arm engaging surface 62a, the stop member 176a engages the lift arm engaging surface 74a, the support member 172b engages the lift arm engaging surface 66b, the stop member 174b engages the lift arm engaging surface 62b, and/or the stop member 176b engages the lift arm engaging surface 74b. Concurrently, the rotatable shaft 144 of the agitating member 140 may be inserted into the opening 76, through the brush 78, and into the internal volume 42.

Figure 17:
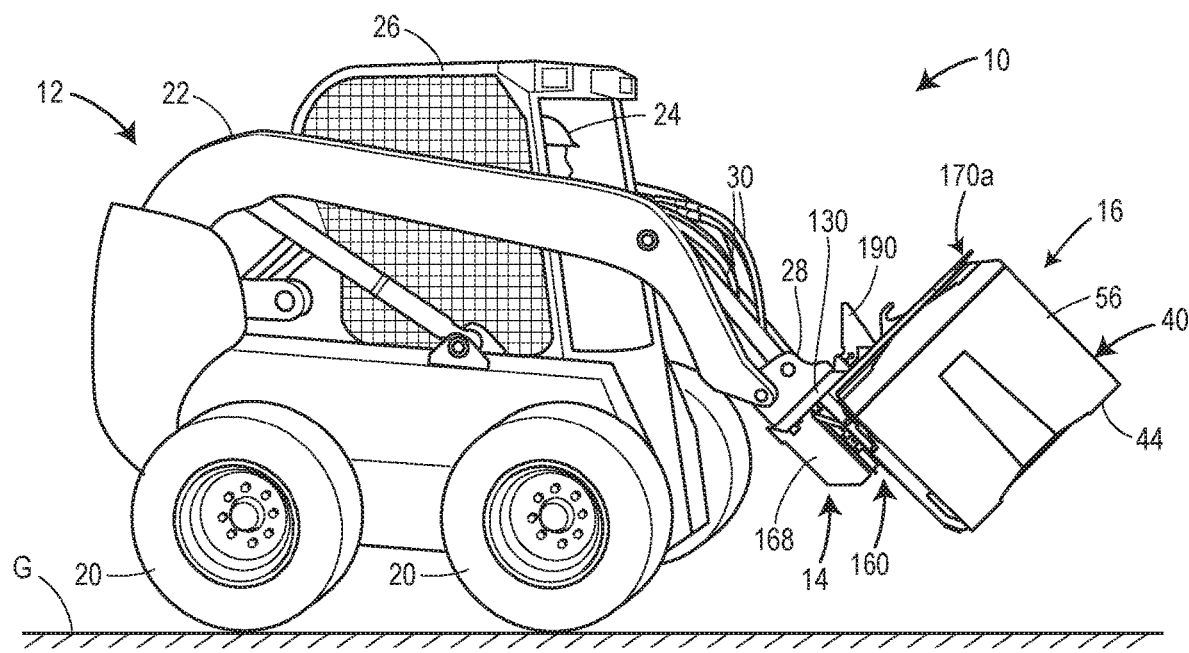
FIG. 17 illustrates a side perspective view of the spreading system of FIG. 1 with the spreader picking up the tote.

Once the support members 172a and 172b engage their respective lift arm engaging surfaces 74a and 74b, the operator 24 may begin rotating the spreader 14 in a counterclockwise direction, as seen in FIG. 17. The operator 24 may continue rotating the spreader 14 in the counterclockwise direction until the front wall 50 and the rear wall 48 of the tote 16 are substantially parallel to the ground G and the opening 76 faces in the downward direction toward the ground G, as illustrated in FIG. 18. As a result, gravity may pull the de-icing material toward the opening 76 and into contact with the bristles 80 of the brush 78, with this movement of the de-icing material being facilitated by the tapered shape of the internal volume 42. In some embodiments, the bristles 80 of the brush 78 may be sufficiently stiff that they do not deform under the weight of the de-icing material. Accordingly, leakage of the de-icing material may be prevented prior to operation of the agitating member 140.

Next, the operator 24 may drive the loading machine 12 to an application site, which may be relatively nearby where the tote 16 was initially placed on the ground G. Once at the application site, the operator 24 may activate the agitating member 140, which may exert a downward force on the de-icing material. In response, the de-icing material may exert downward force on the bristles 80 of the brush 78 causing them to deform and create temporary openings in the brush 78. These temporary openings may permit the de-icing material to fall through the opening 76 and into to the inlet 150. In some embodiments, the bristles 80 of the brush 78 may deform to permit passage of the de-icing material solely as a result of the weight of the de-icing material, regardless of the agitating member 140 exerting a downward force on the de-icing material.

After passing through the inlet 150, the de-icing material may fall onto the spinner plate 162 of the discharge mechanism 160 which may be rotating. As a result, the de-icing material may be spread in a radial pattern onto the ground G. During the spreading of the de-icing material, the tote 16 may remain mounted on the spreader 14 as shown in FIG. 18. Thus, the operator 24 may carry the tote 16 with the loading machine 12 while simultaneously driving the loading machine 12 over the application site and simultaneously operating the discharge mechanism 160 to discharge the material onto the ground. This eliminates the need to have to place the tote 16 back on the ground before commencing the spreading operation.

Once a desired amount of the de-icing material has been discharged onto the ground G, the operator 24 may rotate the spreader 14 in a clockwise direction such that the first and second lift arms 170a and 170b are parallel to the ground G. Then, the operator 24 may vertically lower the boom 22, place the tote 16 on the ground G, and drive the loading machine 12 in the reverse direction to disengage the first and second lift arms 170a and 170b from the tote 16.

It is noted that the spreader 14 may be a standalone device or may be an attachment which can be coupled to an existing loading machine as described above. Also, while the present embodiment of the spreader 14 is described as being attached to a skid loader, in other embodiments, the spreader 14 may be coupled to another type of loading machine including a backhoe, a wheel loader, a tractor, an excavator, or any other suitable device or vehicle.

Figure 19:
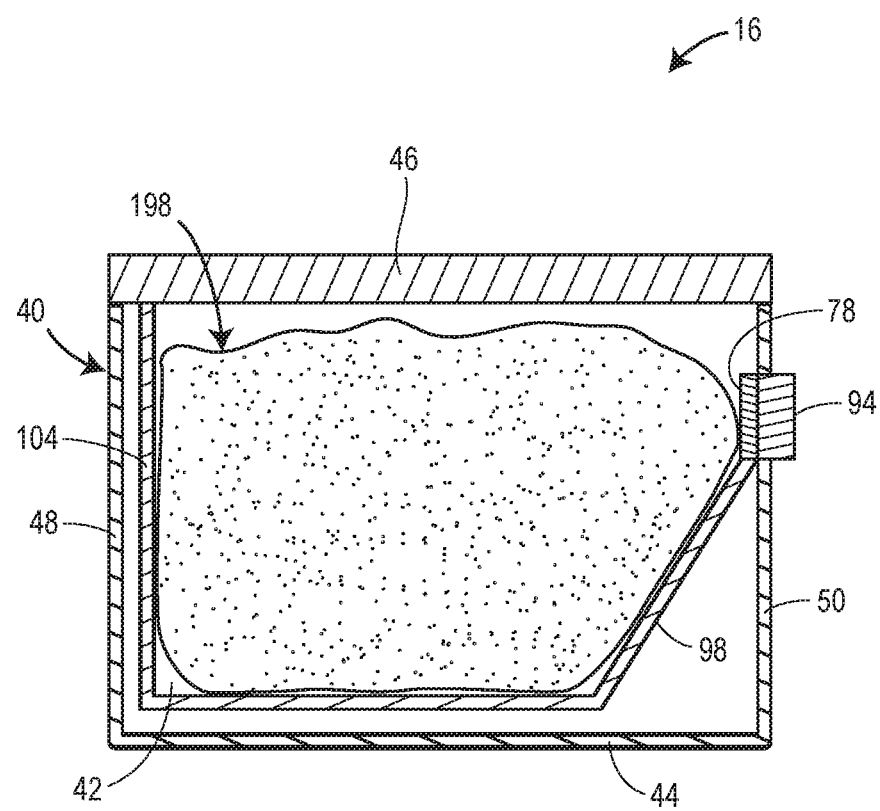
FIG. 19 is a cross-sectional view of the tote illustrated in FIG. 2, containing a bag filled with the de-icing material.

Referring to FIG. 19, in some embodiments the de-icing material may not be stored in direct contact with the interior walls 96-106 of the container 40. Instead, a flexible secondary container 198 may be filled with the de-icing material and then disposed within the internal volume 42 of the container 40. The flexible secondary container 198 may be sealed closed to shield the de-icing material against degrading environmental elements such as water and humidity. Accordingly, the flexible secondary container 198 provides an additional barrier in the event that moisture is able to bypass the seal formed by the lid 46 of the container 40 and/or the removable plug 94.

The flexible secondary container 198 may be a separate, independent structure relative to the container 40. In some embodiments, the flexible secondary container 198 may be bag or sack that is sealed closed with a twist tie or other band-like fastener. In other versions, the flexible second container 198 may be configured as a press-to-seal bag. The flexible secondary container 198 may be pre-filled with the de-icing material and purchased by the user in this condition, or, alternatively, the flexible secondary container 198 may be filled with the de-icing material by the user after purchase. In general, the flexible secondary container 198 may be constructed of a material that is more flexible than the walls 44-54 and 96-106 of the container 40. This flexibility may be achieved by constructing the flexible secondary container 198 of a woven fabric and/or woven polymer material. In other embodiments, the flexible secondary container 198 may be constructed of a paper or laminated paper material, or a non-woven polymer material such as, for example, a plastic bag. In addition to being flexible, the material used to construct the flexible secondary container 198 may be thin enough such that it can be pierced by the tip of the rotatable shaft 144 of the agitating member 140 of the spreader. In some embodiments, the tip of the rotatable shaft 144 may be sharpened or otherwise tapered to a point to facilitate piercing of the flexible secondary container 198.

In use, the flexible secondary container 198, previously filled with the de-icing material, may be placed within the internal volume 42 of the container 40. Later, when the tote 16 is to be used in a spreading operation such as the one described above, the tip of the rotatable shaft 144 of the agitating member 140 may be inserted through the opening 76, then through the brush 78, and subsequently pierce the flexible secondary container 198. The resulting hole formed in the flexible secondary container 198 may allow the de-icing material to fall out of or be pulled from the flexible secondary container 198 and into the outlet 110 during the spreading operation. Furthermore, the flexibility of the walls of the flexible secondary container 198 may allow them to conform to the tapered shape of the internal volume 42 of the container 40. Accordingly, the tapered shape of the internal volume 42 may funnel the de-icing material toward the outlet 110 despite the presence of the flexible secondary container 198.

Figure 20:
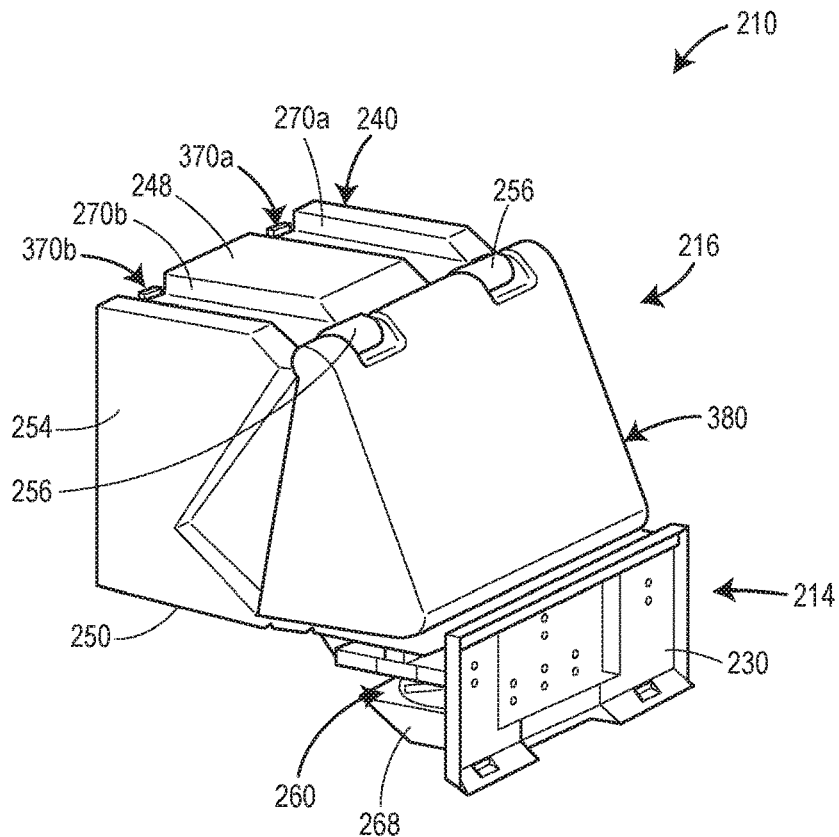
FIG. 20 illustrates a side perspective view of another embodiment of a spreading system in accordance with principles of the present disclosure.
Figure 21:
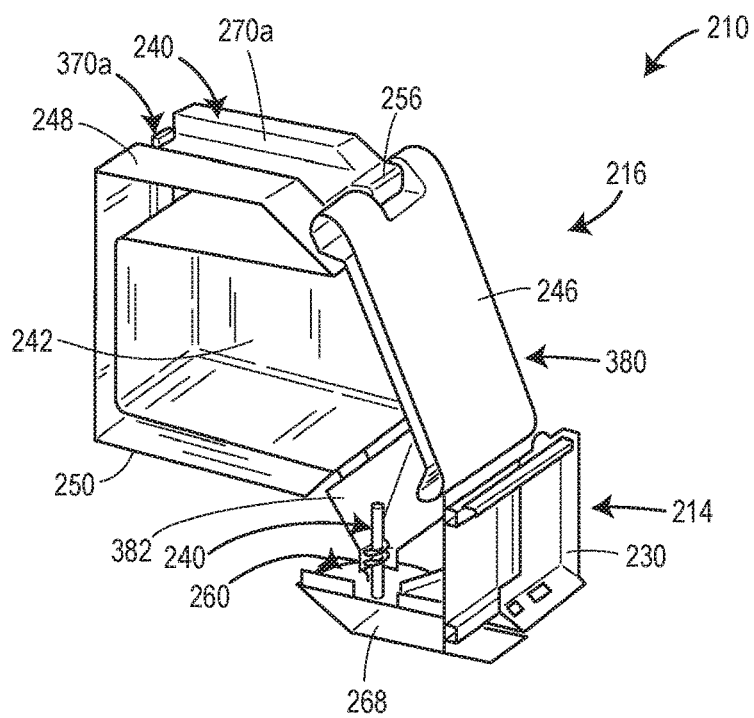
FIG. 21 is a cutaway view of the spreading system shown in FIG. 20.

Turning to FIGS. 20 and 21, illustrated is a spreading system 210 in accordance with another embodiment of the present disclosure. The spreading system 210 is similar in many respects to the spreading system 10 described above, except that the tote 216 of the spreading system 210 utilizes a swinging door 380 for its closure member in lieu of the brush and removable plug arrangement. Elements of the spreading system 210 which are similar in structure and/or function to elements of the spreading system 10 are designated by the same reference numeral, incremented by 200. A description of many of these elements is abbreviated or even eliminated in the interest of brevity.

The swinging door 380 may be formed by the top wall 246 of the container 240. The swinging door 380 may be pivotably connected to the rear wall 248 by one or more hinges 256. Unlike the top wall 46 of the tote 16, the swinging door 380 of the tote 216 may not be latched to the front wall 250 of the container 240. As a result, when the tote 216 is tilted in clockwise direction by the spreader 214 and the de-icing material slides towards and impacts the interior surface of the swinging door 380, the swinging door 380 may rotate in a counterclockwise direction and provide an opening for the de-icing material to flow into the inlet 260 of the spreader 214. The frame 230 of the spreader 240 may act as a stop member which prevents the swinging door 380 from opening too much, as shown in FIGS. 20 and 21.

It is noted that while the spreader 214 may include a small secondary hopper 382, the tote 216 may still function as the primary hopper which funnels the de-icing material into the spreader 214. Also, it is noted that the first and second lift arms 370a and 370b, unlike the first and second lift arms 170a and 170b, do not include stop members on the side of the lift arm closest to the frame 230, so that there is clearance for the swinging door 380 to swing open.

Figure 22:
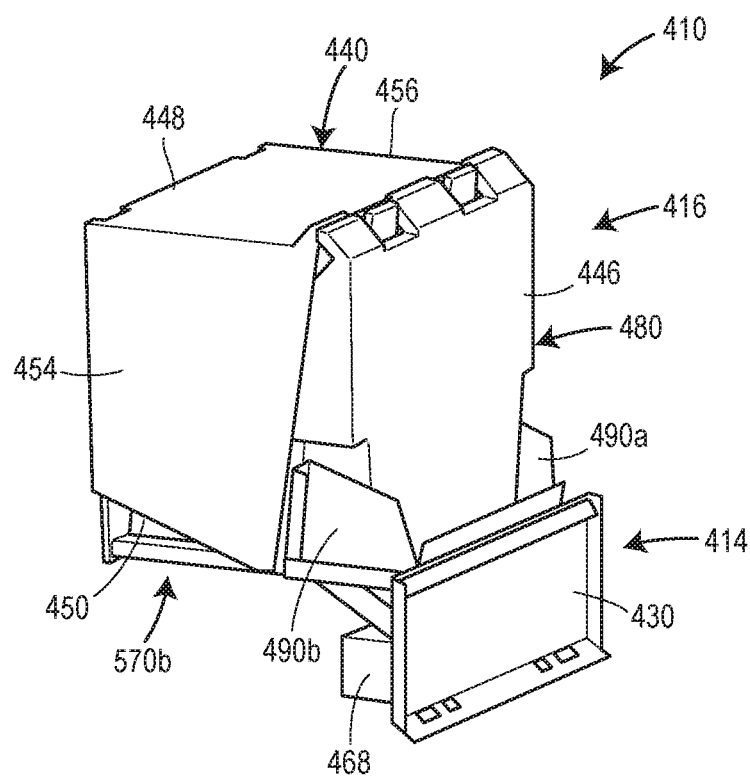
FIG. 22 illustrates a side perspective view of another embodiment of a spreading system in accordance with principles of the present disclosure.
Figure 23:
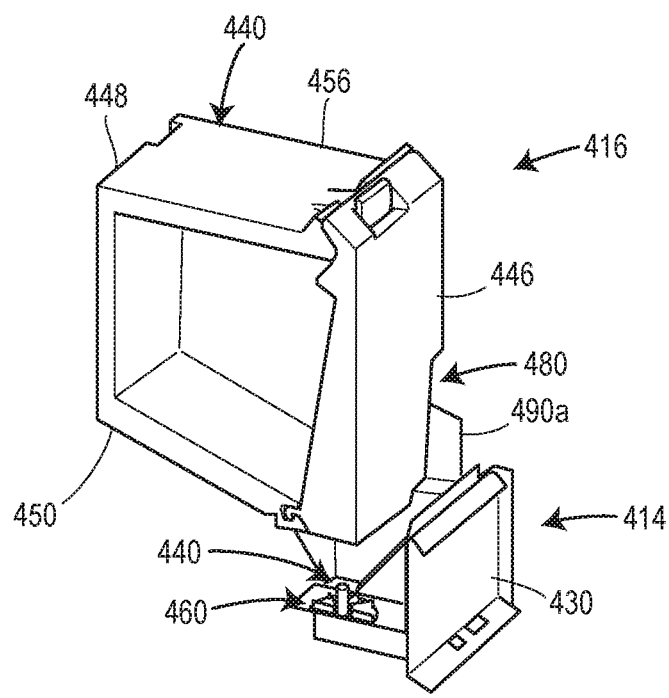
FIG. 23 is a cutaway view of the spreading system illustrated in FIG. 22.

FIGS. 22 and 23 illustrate is a spreading system 410 in accordance with yet another embodiment of the present disclosure. The spreading system 410 is similar in many respects to the spreading system 210 described above, except that the spreader 414 includes lateral stop members 490a and 490b to inhibit lateral movement of the tote 416 relative to the spreader 414 during a spreading operation. Elements of the spreading system 410 which are similar in structure and/or function to elements of the spreading system 210 are designated by the same reference numeral, incremented by 200. A description of many of these elements is abbreviated or even eliminated in the interest of brevity. It is noted that the swinging door 480 is shown in a closed position in FIGS. 22 and 23, but the swinging door 480 can rotate to an open position permitting transfer of the de-icing material from the tote 416 to the spreader 414.

Still referring to FIGS. 22 and 23, the lateral stop members 490a and 490b may be located on opposite sides of the spreader 414 and may each extend in an upward direction away from the discharge mechanism 460. The swinging door 480 of the tote 416 may be positioned between the lateral stop members 490a and 490b when the tote 416 is carried by the spreader 414 such that the lateral stop members 490a and 490b straddle the tote 416. In addition to inhibiting lateral movement of the tote 16, the lateral stop members 490a and 490b may help guide the de-icing material into the inlet 440 of the spreader 414 when the swing door 480 opens.

From the foregoing, it can be seen that the present disclosure advantageously provides spreading systems and methods enabling the storage of a de-icing material in one or more totes at an application site. Accordingly, it may be unnecessary to store the de-icing material in a large pile requiring heavy equipment, such as a wheel loader, for loading and re-loading a spreading device from the pile. Furthermore, the presently disclosed systems and methods may eliminate or reduce the need for gritters or salt trucks dispatched from a centralized storage location, where the de-icing material is stored, to a remote application site. Still further, the presently disclosed systems and methods advantageously allow the de-icing material to be staged on-site in advance of an event such as a snow and/or ice storm. Business owners, contractors, etc. may therefore project how much de-icing material will be needed for an upcoming season and purchase an appropriate amount. Moreover, cost savings may be realized by avoiding the purchase of the de-icing material when market demand is high, for example, in the run-up to a winter weather event.

It is noted that the spreading systems and methods of the present disclosure are not limited to spreading de-icing materials. Rather, the spreading systems and methods of the present disclosure can be used in any application requiring or benefiting from the distribution of a material over a large surface area. For example, the spreading systems and methods of the present disclosure can be used in farming and landscaping operations to spread fertilizer, pesticides, water, or any other material.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A material spreading system comprising:
    a spreader including
        a frame attachable to a loading machine,
        a discharge mechanism configured to selectively discharge a material onto the ground, and
        a lift arm rigidly mounted to the frame such that the lift arm and the frame are immoveable relative to each other; and
    a tote including
        a container having a plurality of walls enclosing an internal volume for storing the material,
        an opening formed in one of the plurality of walls and communicating with the internal volume,
        a first lift arm engaging surface configured to engage the lift arm and permit the lift arm to manipulate the tote, and
        a closure member at least partially covering the opening and configured to selectively permit transfer of the material from the container to the spreader in response to the material exerting a force on the closure member.

2. The material spreading system of claim 1, the plurality of walls including a bottom wall, a top wall, a rear wall, a front wall extending between the bottom wall and the top wall, a first sidewall extending between the front wall and the rear wall, and a second sidewall extending between the front wall and the rear wall, wherein the bottom wall defines the first lift arm engaging surface.

3. The material spreading system of claim 2, the opening extending through the front wall and aligned with the discharge mechanism of the spreader.

4. The material spreading system of claim 3, at least a portion of the internal volume tapering in a direction toward the opening.

5. The material spreading system of claim 4, the closure member including a brush aligned with the opening.

6. The material spreading system of claim 5, the brush including an outer peripheral rim and a plurality of bristles extending inwardly from the outer peripheral rim, the plurality of bristles being flexible relative to the outer peripheral rim.

7. The material spreading system of claim 6, the spreader including an agitating member having a rotatable shaft, the rotatable shaft passing through the brush into the internal volume of the container.

8. The material spreading system of claim 7, wherein each bristle of the plurality of bristles extends radially inwardly from the outer peripheral rim and terminates at a respective free end, the free ends of the bristles defining a hole through which the rotatable shaft extends.

9. The material spreading system of claim 2, the top wall being pivotably connected to the rear wall and defining the closure member.

10. The material spreading system of claim 9, the rear wall defining a second lift arm engaging surface.

11. The material spreading system of claim 10, the lift arm having a first tote engaging surface configured to engage the first lift arm engaging surface and a second tote engaging surface configured to engage the second lift arm engaging surface, the first tote engaging surface being non-parallel to the second lift arm engaging surface.

12. The material spreading system of claim 11, the lift arm being L-shaped.

13. The material spreading system of claim 7, the spreader including a wedge protruding inwardly from the frame in a direction toward the agitating member and configured to engage the top wall of the container to secure the top wall of the container in a closed position.

14. The material spreading system of claim 7, the spreader including an adjustable stop member configured to selectively engage the front wall of the container to prevent the rotatable shaft of the agitating member from being inserted through the opening.

15. The material spreading system of claim 1, further comprising a flexible secondary container disposed within the internal volume of the container and filled with the material to be discharged onto the ground, the flexible secondary container being constructed of a more flexible material than the plurality of walls defining the container.

16. A spreading method for a material, the method comprising:
providing a loading machine;
providing a material spreading system comprising: (i) a spreader including a frame attachable to the loading machine, a discharge mechanism configured to selectively discharge the material onto the ground, and a lift arm rigidly mounted to the frame such that the lift arm and the frame are immoveable relative to each other; and (ii) a tote including a container having a plurality of walls enclosing an internal volume for storing the material, an opening formed in one of the plurality of walls and communicating with the internal volume, a first lift arm engaging surface configured to engage the lift arm and permit the lift arm to manipulate the tote, and a closure member at least partially covering the opening and configured to selectively permit transfer of the material from the container to the spreader in response to the material exerting a force on the closure member;
attaching the spreader to the loading machine;
aligning the lift arm of the spreader with a groove formed in a bottom wall of the tote;
driving the loading machine in a forward direction toward the tote such that the lift arm is inserted into the groove;
using the loading machine to rotate the tote to a position where the tote is positioned above the discharge mechanism of the spreader, thereby allowing the material to fall through the opening in the tote onto the discharge mechanism; and
operating the discharge mechanism to discharge the material onto the ground.

17. The spreading method of claim 16, comprising using the loading machine to position the tote below a horizontal line of sight of an operator of the loading machine.

18. The spreading method of claim 16, comprising carrying the tote with the loading machine while driving the loading machine relative to the ground and operating the discharge mechanism to discharge the material from the tote onto the ground.

19. The spreading method of claim 16, comprising, prior to operating the discharge mechanism to discharge the material onto the ground, storing the tote, with the material contained inside the tote, at an application site where the material is to be spread onto the ground.

20. The spreading method of claim 16, wherein driving the loading machine in the forward direction toward the tote such that the lift arm is inserted into the groove comprises inserting an agitating member of the spreader through the opening in the tote and piercing a flexible secondary container disposed within the tote with the agitating member, the flexible secondary container being filled with the material to be discharged onto the ground.

21. A material spreading system comprising:
a spreader including
a frame attachable to a loading machine,
a discharge mechanism, and
a lift arm; and
a tote including
a container having a plurality of walls enclosing an internal volume for storing a material, the plurality of walls including a bottom wall, a top wall, a rear wall, a front wall extending between the bottom wall and the top wall, a first sidewall extending between the front wall and the rear wall, and a second sidewall extending between the front wall and the rear wall,
an opening formed in one of the plurality of walls and communicating with the internal volume,
the bottom wall including a first lift arm engaging surface configured to engage the lift arm and permit the lift arm to manipulate the tote, and
a closure member at least partially covering the opening and configured to selectively permit transfer of the material from the container to the spreader in response to the material exerting a force on the closure member.

22. The material spreading system of claim 21, wherein the discharge mechanism is configured to selectively discharge the material onto the ground.

23. The material spreading system of claim 21, the opening extending through the front wall and being aligned with the discharge mechanism of the spreader.

24. The material spreading system of claim 21, at least a portion of the internal volume tapering in a direction toward the opening.

25. The material spreading system of claim 21, the closure member including a brush aligned with the opening.

26. The material spreading system of claim 25, the brush including an outer peripheral rim and a plurality of bristles extending inwardly from the outer peripheral rim, the plurality of bristles being flexible relative to the outer peripheral rim.

27. The material spreading system of claim 26, the spreader including an agitating member having a rotatable shaft, the rotatable shaft passing through the brush into the internal volume of the container.

28. The material spreading system of claim 27, wherein each bristle of the plurality of bristles extends radially inwardly from the outer peripheral rim and terminates at a respective free end, the free ends of the bristles defining a hole through which the rotatable shaft extends.

* * * * *